(12) United States Patent  
Hall et al.

(10) Patent No.: US 6,274,868 B1  
(45) Date of Patent: Aug. 14, 2001

(54) ALL PURPOSE FLIR KIT FOR AIRCRAFT

(75) Inventors: John M. Hall; Richard A. Wright, both of Alexandria, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/361,805

(22) Filed: Jul. 27, 1999

Related U.S. Application Data

(66) Substitute for application No. 08/899,204 on Jul. 23, 1997, now abandoned.

(51) Int. Cl.[7] ............................... G02B 13/14; G01J 5/08
(52) U.S. Cl. ......................... 250/332; 250/334; 359/351
(58) Field of Search ................................. 250/332, 334, 250/353, 350; 359/351, 357, 356

(56) References Cited

U.S. PATENT DOCUMENTS

| | | | |
|---|---|---|---|
| 4,486,069 | * | 12/1984 | Neil et al. ........................... 359/353 |
| 4,983,837 | * | 1/1991 | Cooper et al. ...................... 250/334 |
| 5,274,235 | * | 12/1993 | Taylor ................................. 250/332 |
| 5,343,040 | * | 8/1994 | Wiese et al. ...................... 250/252.1 |
| 5,369,276 | * | 11/1994 | Antesberger ....................... 250/334 |
| 5,479,016 | * | 12/1995 | Curry et al. ........................ 250/334 |
| 5,510,618 | * | 4/1996 | Blecha et al. ...................... 250/332 |
| 5,623,146 | * | 4/1997 | Jones et al. ........................ 250/334 |
| 5,648,868 | * | 7/1997 | Hall et al. .......................... 359/364 |
| 6,118,578 | * | 9/2000 | Hall .................................... 359/356 |

* cited by examiner

Primary Examiner—Constantine Hannaher  
Assistant Examiner—Albert Gagliardi  
(74) Attorney, Agent, or Firm—Milton W. Lee; John E. Holford; Alain L. Bashore

(57) ABSTRACT

FLIR kits are provided comprising optical and related components which can be commonly used for both navigational and targeting scenarios. Such components include a common detector interface, imaging optics, scanner, interlacer, filter wheel, and thermal reference sources with integrated chopper/rotator assembly, all of which when assembled form a stand-alone imaging sensor when combined with a common associated electronics subassembly. The kits are integrated into standard navigational and targeting platforms of the type found on the AH-64 Apache and RAH-66 Comanche attack helicopters.

20 Claims, 21 Drawing Sheets

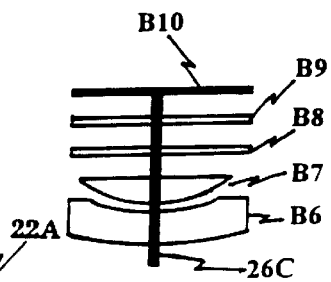
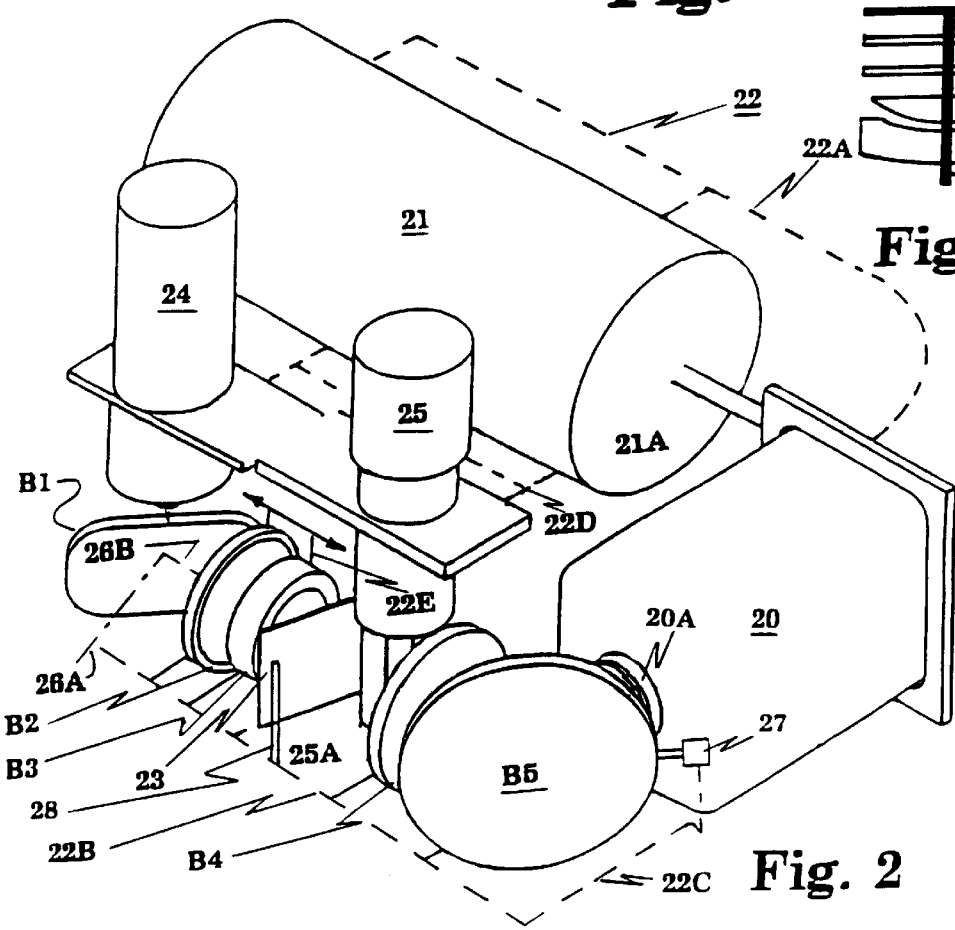

AIRKIT Optical Assembly

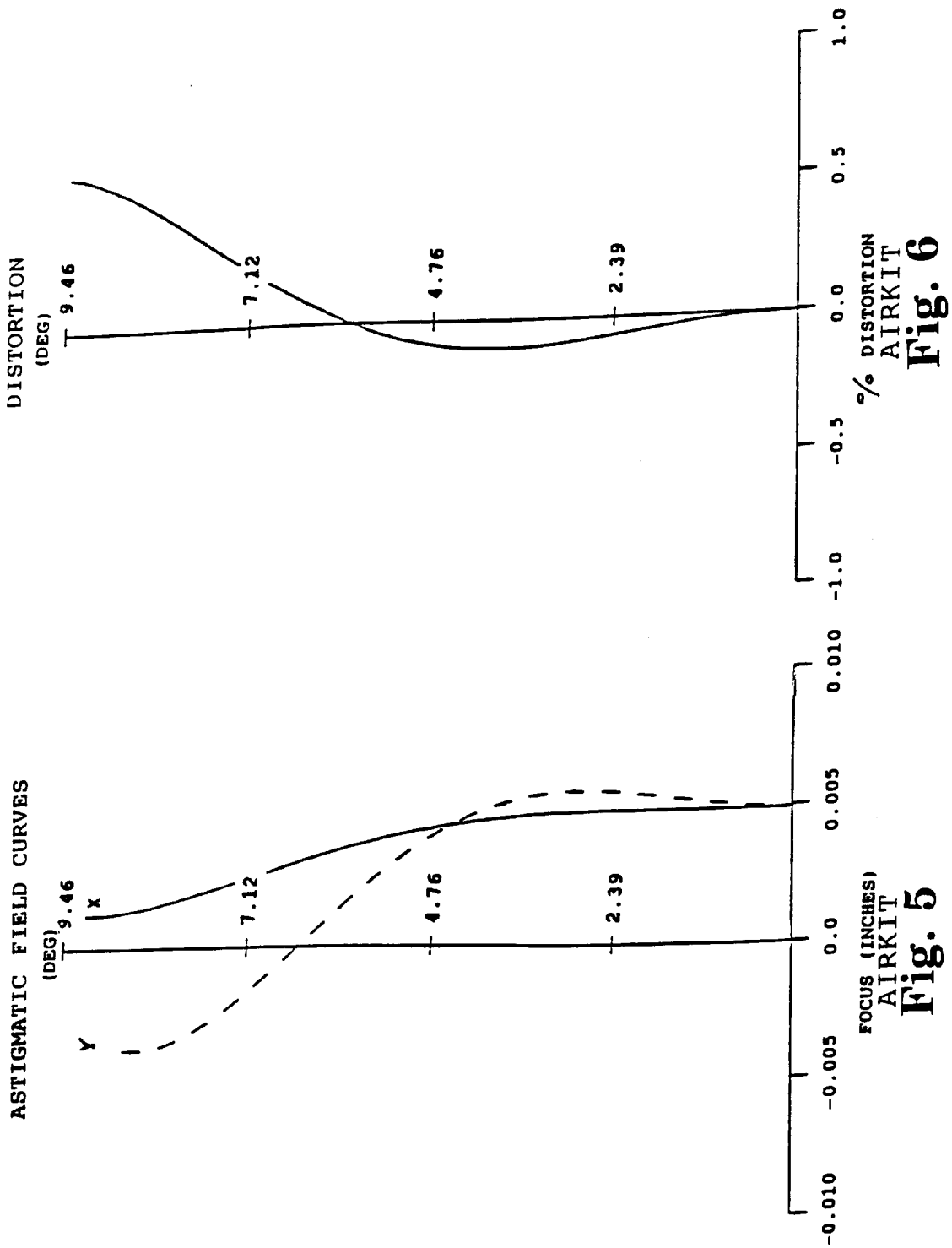

Targeting 2.78X Relay Afocal

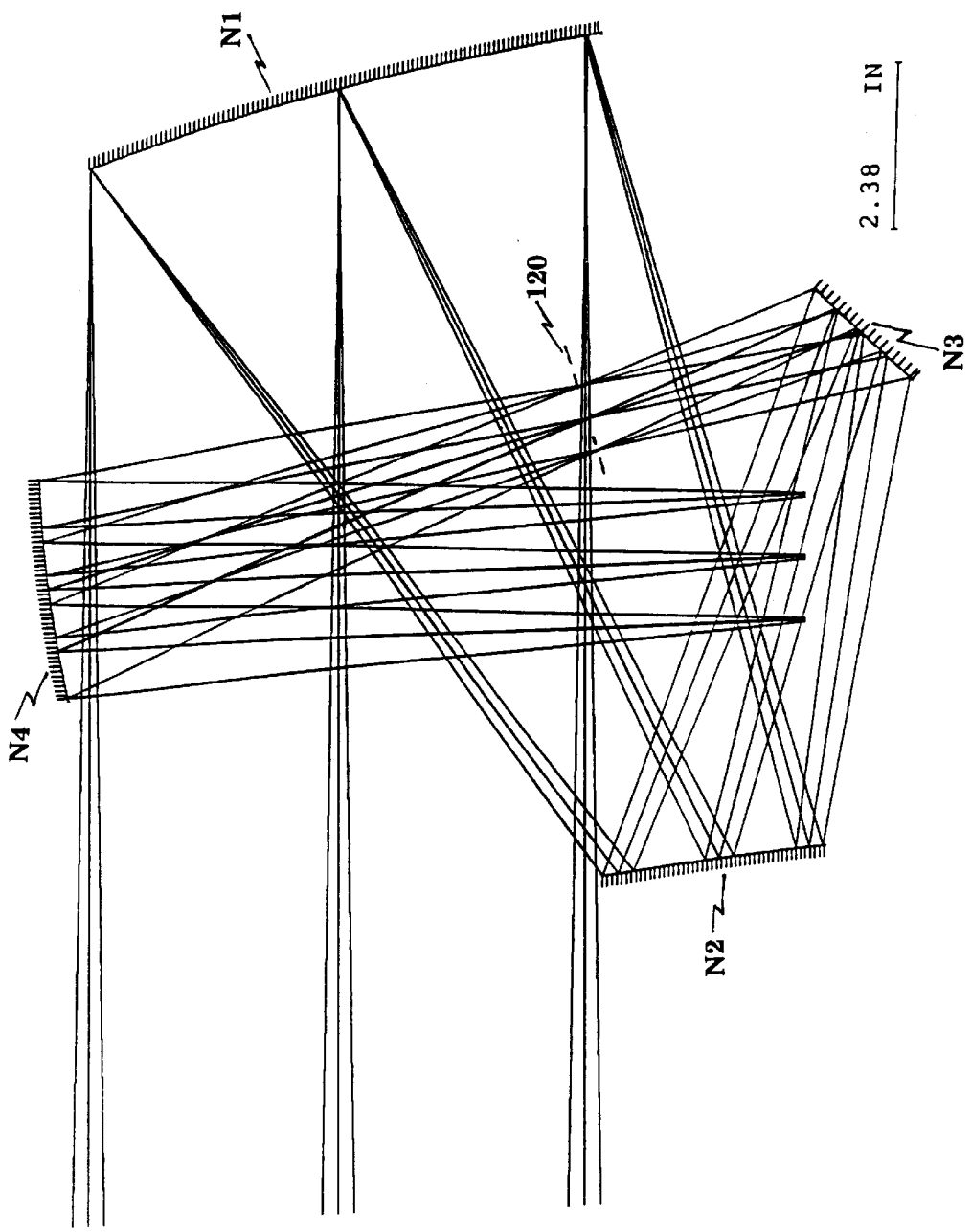

Target Refl 4.02X Afocal

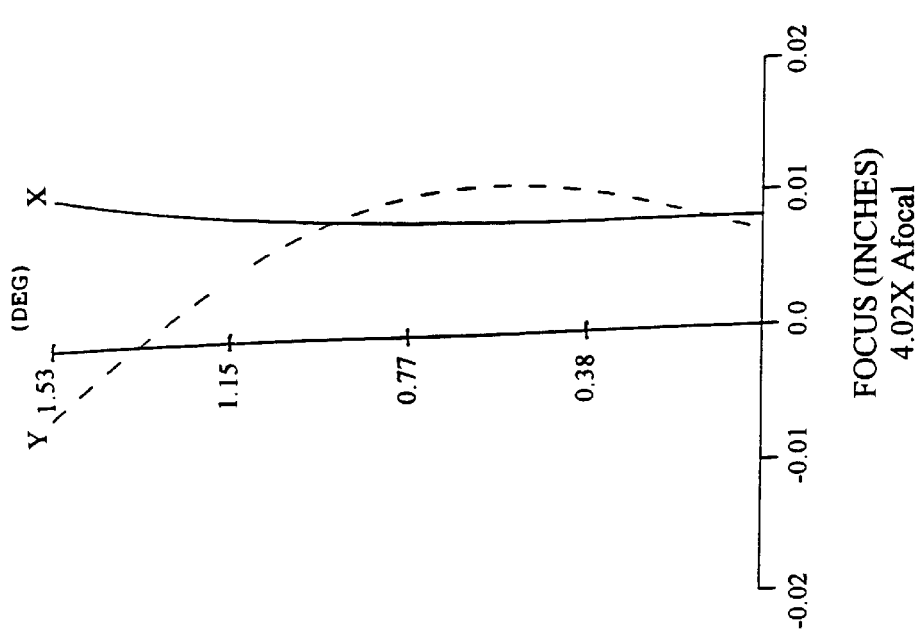

Navigation FLIR 0.62X Afocal

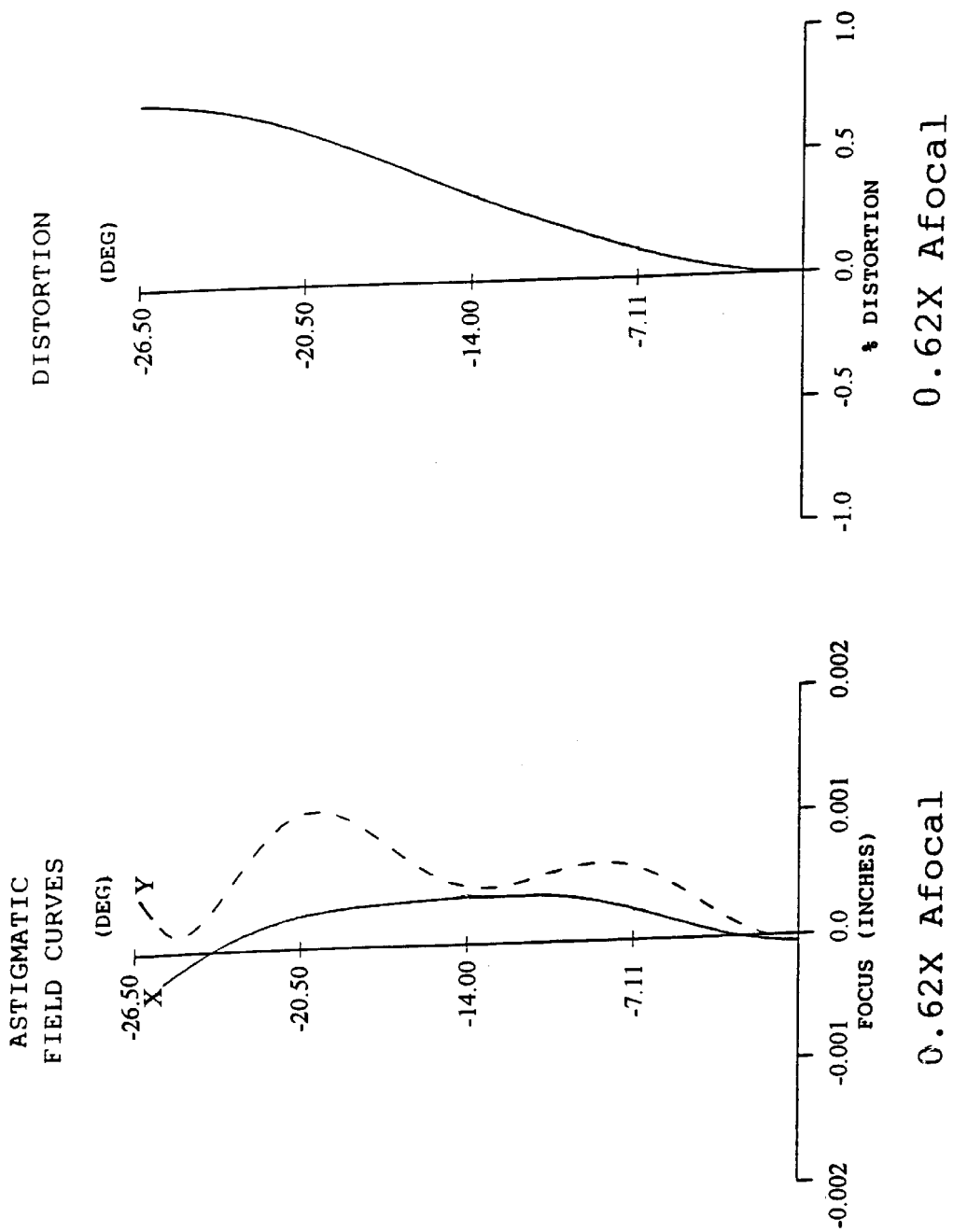

Targeting 0.22X Wide FOV Afocal

ALL PURPOSE FLIR KIT FOR AIRCRAFT

RELATED APPLICATION

This is a Substitute Application for patent application Ser. No. 08/899,204, filed Jul. 23, 1997, now abandoned.

BACKGROUND OF THE INVENTION

1. Field of the Invention

The present invention generally relates to a Forward Looking InfraRed (FLIR) imaging system. More particularly it involves a multi-functional kit of core sensor components, including novel optical layouts, which can be integrated into a variety of configurations for varied uses, including target detection, acquisition, identification, classification, prioritization and disposal.

2. Description of Prior Art

In a prior art U.S. Pat. No. 5,479,016 entitled, "Compact Second Generation FLIR Kit", issued to J. Curry, et. al., on Dec. 26, 1995, there is described a FLIR "Kit" which replaces older First Generation FLIR's in common military ground vehicles. The kit is comprised of various modules, which may be upgraded and interchanged as long as the Kit interfaces to the host platform remain unchanged. This compact Kit is designed to meet the requirements for ground based targeting missions, and is optimized for integration within appropriate platforms. In a pending patent application Ser. No. 08/440,399 entitled "SECOND GENERATION FLIR NV-81" Filed: May 12, 1995, by John M. Hall, et al. a FLIR Kit is proposed for navigational applications in Army aviation platforms such as the AH-64 Apache helicopter. The Apache and the current U.S. Army Comanche prototype helicopter models include FLIR components which perform the tasks of low light level navigation and targeting, but do not meet the commonality and other requirements set for second generation FLIRS. An object of the present invention is to provide a second generation targeting FLIR that can be used in either type of helicopter and uses many components from existing second generation FLIRS.

SUMMARY OF THE INVENTION

A new 2nd GEN FLIR "B-Kit" is proposed which allows individual modules within the Kit to be upgraded or exchanged so long as the Kit interfaces to the host platform remain constant. The new Kit is designed to accommodate packaging schemes specifically optimized for use in military aviation or gimbaled platforms, and a single Kit will contain the components required for either Navigation or for Targeting. Such components include a common detector interface, imaging optics, scanner, interlacer, filter wheel, and thermal reference sources with an integrated chopper/rotator assembly, all of which when assembled form a stand-alone imaging sensor when combined with a common associated electronics subassembly.

BRIEF DESCRIPTION OF THE DRAWINGS

The foregoing and other objects, aspects and advantages will be better understood from the following detailed description of a preferred embodiment of the invention with reference to the drawings, in which:

FIG. 1 shows an isometric front view of an Army AH-64 Apache helicopter equipped with three optically instrumented nose turrets to aid crew members with navigation, surveillance, targeting and fire control;

FIG. 2 shows an assembly of components known as an airkit that provide a core sensor for a FLIR utilized in two of the three turrets above;

FIG. 5 shows an astigmatic field curve for the airkit;

FIG. 6 shows a distortion curve for the airkit assembly;

FIG. 12 shows a ray trace diagram of the optical path through an afocal lens having a narrow FOV which can be placed in the optical path ahead of the airkit and relay lenses;

FIG. 14 shows an astigmatic field curve for the narrow FOV afocal above;

FIG. 15 shows a distortion curve for the narrow FOV afocal above;

FIG. 18 shows an astigmatic field curve for the navigational afocal above;

FIG. 19 shows a distortion curve for the navigational afocal above;

DETAILED DESCRIPTION OF A PREFERRED EMBODIMENT OF THE INVENTION

Figure 3:
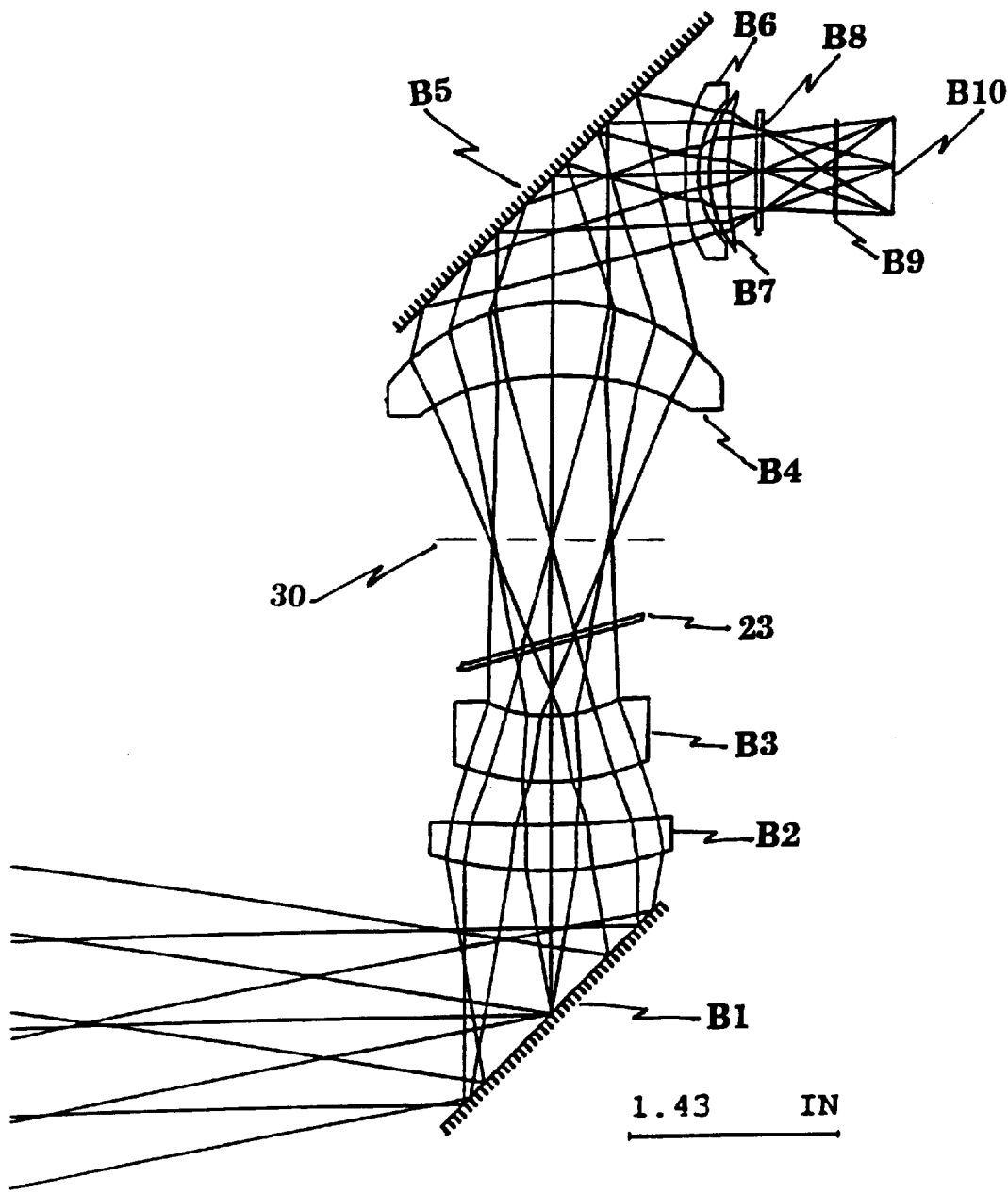
FIG. 3 is a ray trace diagram of the optical path through the airkit Showing its vibratory folding mirrors, lenses, and filter windows.

Referring now to the drawings, and more particularly to FIG. 1 there is shown an Army Apache type Helicopter equipped with separate night and day surveillance systems. The optics and many of the other supporting elements for these systems are housed in three turrets attached to the nose of the aircraft. On other aircraft it is proposed to locate these in other positions, but their form and function will remain the same. The first of the above turrets 10 contains a gunner's FLIR that supplies a high resolution visible image in both digital and analog formats to support manual or automatic target detection, recognition, classification, threat assessment, fire control and in emergencies to aid in navigation. A second turret 11 contains a navigation FLIR for the pilot that supplies a normal resolution flicker free visible image. The third turret contains daysights and observation equipment for use under high light level conditions FIG. 2 shows an isometric view of the components of applicant's novel airkit, a basic kit developed for second generation (GEN II) Forward Looking Infrared sensors (FLIR's). All components are scaled relative to each other in the figure. The key active optical component of the kit is an electronic dewar 20 of the Army SADA type with an optical input window 20A. This dewar, which is connected to an electrical wire harness built into the aircraft, has a cold finger containing liquid nitrogen and a multiplicity of electronic connectors to electrically interface and physically support a far-infrared sensor array at its tip. The chip includes a few very long parallel columns of MgCdTe diodes. When the long dimension of each column is optically scanned normally with a far-infrared image adjacent the se diodes gene rate line pairs with resolution several times greater than conventional silicon TV type chips. The columns are stepped lengthwise less than the spacing between adjacent diodes in the column permitting later time-delay-integration (TDI) of the resultant overlapping images. The above dewar is rigidly coupled to a cryogenic cooler 21 by means of a section 22A of an optical platform 22 that interlinks all of the components shown. The dewar receives coolant from the cooler through a flexible tubing 21A. Examples of this arrangement are found in the above patents.

A first group of passive optical components including a scan mirror B1 mounted on a vibrating motor 24, refracting lenses B2–B4, filter 23, a three position standard temperature sampler 25 with a mirrored stem 25A, and a second folding mirror B5 with a vibrating motor 27 are arranged along a straight middl e segment 26B of a folded optical axis 26 that traverses all of the optical elements of the FLIR. A pair of temperature standards, like standard 28, are mounted in a standard plane through stem 25A normal to the optical axis. This axis further includes input and output segments 26A and 26C, respectively, extending substantially normal to the segment 26B at its ends. The input segment, which is the end portion of a segment of another kit and the output or last segment extend in opposite directions, the last segment 26C terminating in the dewar at the array chip B10, as shown in FIG. 2a, after passing through lens elements B6–B7 and dewar input windows B8–B9. The dewar houses a rectangular line array of MgCdTe diode detectors, the longest dimension defining a line resolution much greater than a commercial TV raster and the shorter dimension defining several extra columns of diodes for time delay integration. Optical platform 22 also includes portions 22C, 22D and 22E. Portion 22C is mechanically and optically coupled to an input window frame 20A of the dewar and, of course, to section 22B. The standard temperature sampler is coupled to the cooler by platform section 22D, as well as sections 22A–C, to form a sturdy integrated unit. A commercially available remotely operated motorized slide 22E can be used to couple lens elements B2 and B3 to the platform. The above platform sections 22A–E also include some standard means, e.g. lugs or legs to couple the entire airkit to the floor in one or more of the turrets previously discussed. Sections 22B and 22C will generally be opaque tubular lens housing section 22B having first and second tubular 90 degree elbows centered on mirrors B1 and B5, respectively.

The standard sampler is a commercially available item that contains a remote controlled motor to swing the stem 25A in a standard plane normal to the optical axis. is The stem has two flat orthogonal mirrored surfaces with an image space between them. During image scans, radiation from the input image passes through the image space. A separate fixed temperature standard, e.g. an electrically warmed filament 28. is mounted on opposite sides of the stem in the standard plane. The stem vibrates parallel to the standard plane. The mirrored stem surfaces are oriented at 45 degrees with the optical axis, such that they reflect the filament images through lens B4 as they sequentially move in and out of the optical path between scans, for later comparison with input image radiation. When the standard is placed off axis a distance equal to that between the standard plane and the intermediate focal plane the filament image appears to reside in the center of the latter plane, which provides excellent resolution while freeing the space near the intermediate plane for other uses. Folding mirror B1 is mounted on platform 22, in the usual split angle relationship to segments 26A and 26B and vibrates through a scan angle about an axis normal to the common plane of these segments. Mirror B5 is preferably mounted similarly with respect to segments 26B and 26C, but is mounted to platform 22 through a simpler motor 27 that can vibrate it through a much smaller interlace angle about an axis parallel to the latter segments. A standard wiring harness, not shown, is connected between the electrical FLIR components and the power supply of the aircraft as well as central processing units mostly in the turrets and the display controllers on instrument boards of the crew members, as is well understood in the art.

This kit, similar to one described in the Curry and Hall patents above, is designed to fit in this identical configuration in both the gunners FLIR turret 10 or the pilots navigation turret 11 of the Apache helicopter. Similar spaces are available in the proposed Commanche helicopter. The opaque lens housings, for example, may consist mainly of stiff metal or plastic tubing with a circular cross-section slightly larger than the largest lens. Lenses and folding mirrors can be mounted in such tubes in the fashion of telescopes and similar structures well known in the art. Such tubes can be joined by straight couplings or elbows and so as to provide rigid, sliding or rotating joints. Folding mirrors, of course, are mounted in all elbows. Brackets, adapters, fasteners and other hardware for mounting the airkit housing to the turret floor are part of the kit. Further optical data for axial elements B1–B7 and elements B8–B10 is provided in Table 1 at the end of the specification.

FIG. 3 shows a ray trace diagram of the optical path through the airkit structure of FIG. 2. Collimated incoming radiation is first received by scanning mirror B1. Next it passes through lens elements B2 and B3 which form a tightly focused first image at a first focal plane 30. This is accomplished with very little chromatic or spherical distortion. Light from the first image is next tightly collimated by lens element B4 in preparation for simultaneous interlace scanning. The scanning is subsequently accomplished by the motorized interlace mirror B5. This interlace mirror is capable of oscillating at the same rate as the scanner mirror, but causes very little decentering since it covers only a small angle, i.e. on the order or microradians, in an orthogonal direction to the scan mirror. In both interlaced and non-interlaced systems both motorized mirrors may be used in a common replacement unit, for non-interlace one mirror is used as a fixed (unenergized) element. The scanner mirror preferably oscillates about an axis normal to the turret floor, at rates on the order 30 Hz to 60 Hz, and covers an angular deviation of the optical path of at least 45±8.68 degrees. Elements B2 and B3 are an air-spaced, positive power doublet which form an intermediate focus further enhanced with a small area filter 23, that performs better near but not at the intermediate focus. The thermal references, like reference 24 and families of filters, that discriminate either with respect to frequency, amplitude or both; are commercially available. Such filters can be arranged on a rotating disk that sequences through small ranges within a larger spectrum. FLIRs also sometimes employ choppers that shutter the light from an image source. Still another possibility is a power limiter.

To accommodate such elements, the GEN II FLIR system has been designed with two separate high quality focal planes of which the airkit provides one. It is recommended that the desired filter element 23 be placed between element B3 and the focal plane 30, as shown, and the temperature references between the focal plane and B4. Elements B6 and B7, shown in FIG. 2A, are another air-spaced doublet which forms the final image on the front surface of the sensor or detector array B10. The radiation from this doublet passes through an outer window wall B8, a vacuum space and the inner window wall B9 of a removable heat baffle placed over the tip of the coldfinger and supported by the vacuum bottle in the dewar. Detector B10 is supported by the to resilient tip of the cold-finger and a thin system aperture stop is sandwiched between the detector and the inner wall. The Aperture stop is thus located inside the cryogenic dewar, minimizing the presence of stray radiation. The locations of the scanner and interlace fold mirror provide free access around the intermediate focal plane 30 for both filter placement and for integration with a periodic chopper mechanism, as is common in many GEN II FLIR systems. This mechanism temporarily interrupts the optical path in order to inject controlled thermal reference sources, which then permit automatic calibration of the detector array. The chromatic aberration balance of this system is such that all the lenses can be made from one thermally invariant material, such as GaAs, with only element B7 made of ZnS for color balancing in the final focus. Other aberrations, including optical distortion, are compensated in the final focus by placing one aspheric curvature on each of the elements. Using the specifications from Table I, at the end of this specification, the first order optical parameters of this embodiment provides a focal length of 1.98", and a working f-number as fast as F#1.65, although it will be shown later that the same optical configuration will perform well at slower f-numbers such as F#/3.16. Not included in the table is the exact position of the filter element, which is recommended to be positioned near the intermediate focus in order to reduce its size. Other positions may be considered, however, because the filter element adds no optical power, and simple radial and axial offsets of any following lens elements can restore the reported MTF resolution. Additionally, this design is scaleable within a fairly broad range, such that the airkit optics focal length may be scaled to 1.89" or 2.4" if desired. An option for range focusing can also be considered in this design concept, if desired. The axial positions of elements B2 and/or B3 may be controlled by a motorized slide 22E, and can be moved several tenths of an inch in order to focus on objects which are not located at optical infinity, i.e., non collimated radiation.

Figure 4:
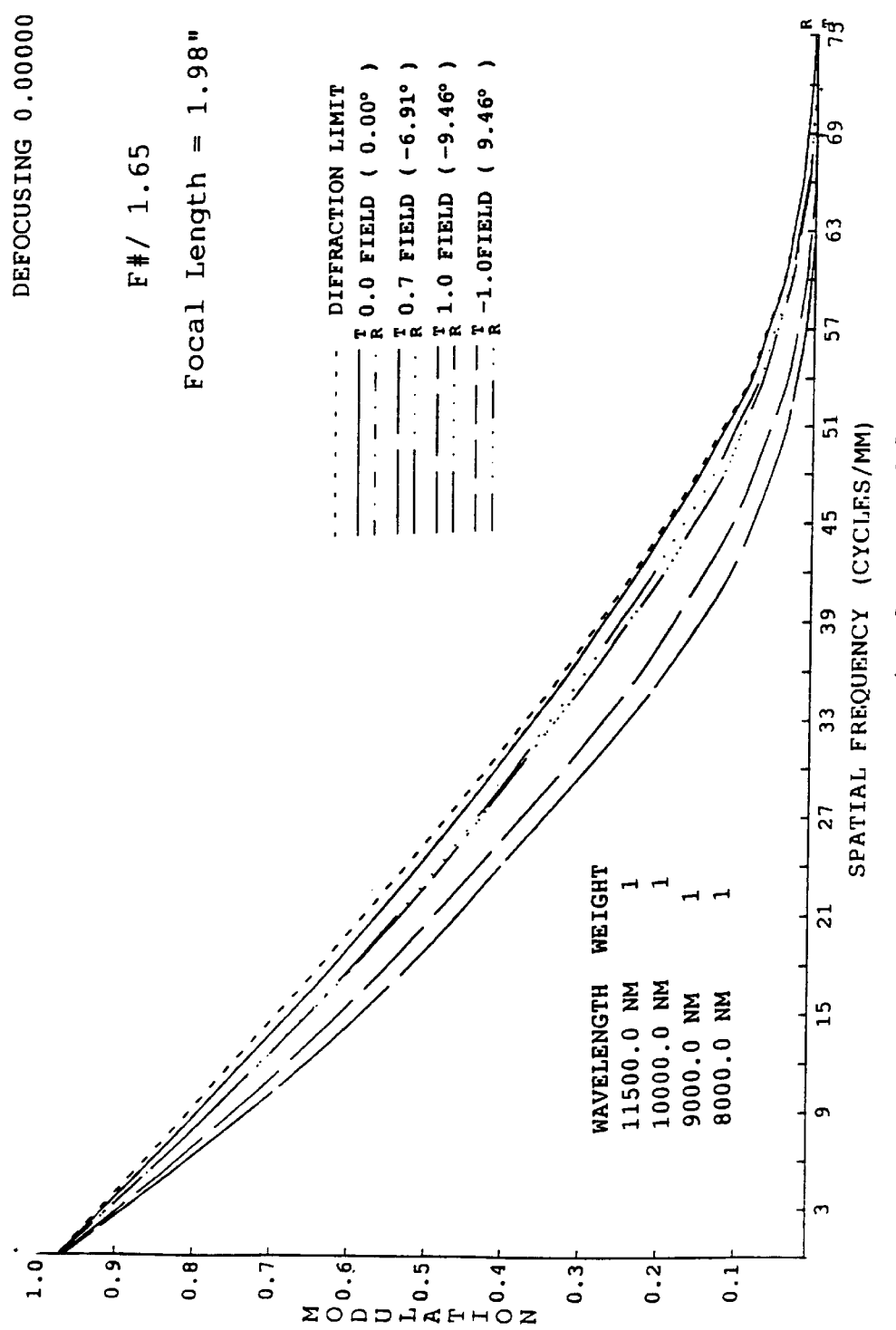
FIG. 4 shows a plot of the Modulation Transfer Function (MTF) of the FIG. 3 air kit assembly stopped to a speed of f/1.65.

FIG. 4 shows the Modulation Transfer Function (MTF) optical resolution performance of the airkit at F#/1.65. As is well known in the art, MTF is the Fourier Transform of the line spread function in the final focal plane, and thus a good MTF implies that the optical system provides a small, nearly diffraction limited spot size across the field of view.

FIG. 5 shows the astigmatic focus shift plot for the airkit. The astigmatic focus is useful for determining mounting tolerances for the detector FPA.

FIG. 6 shows the distortion plot for the airkit. Distortion is less than 5% for the entire vertical field of view.

Figure 7:
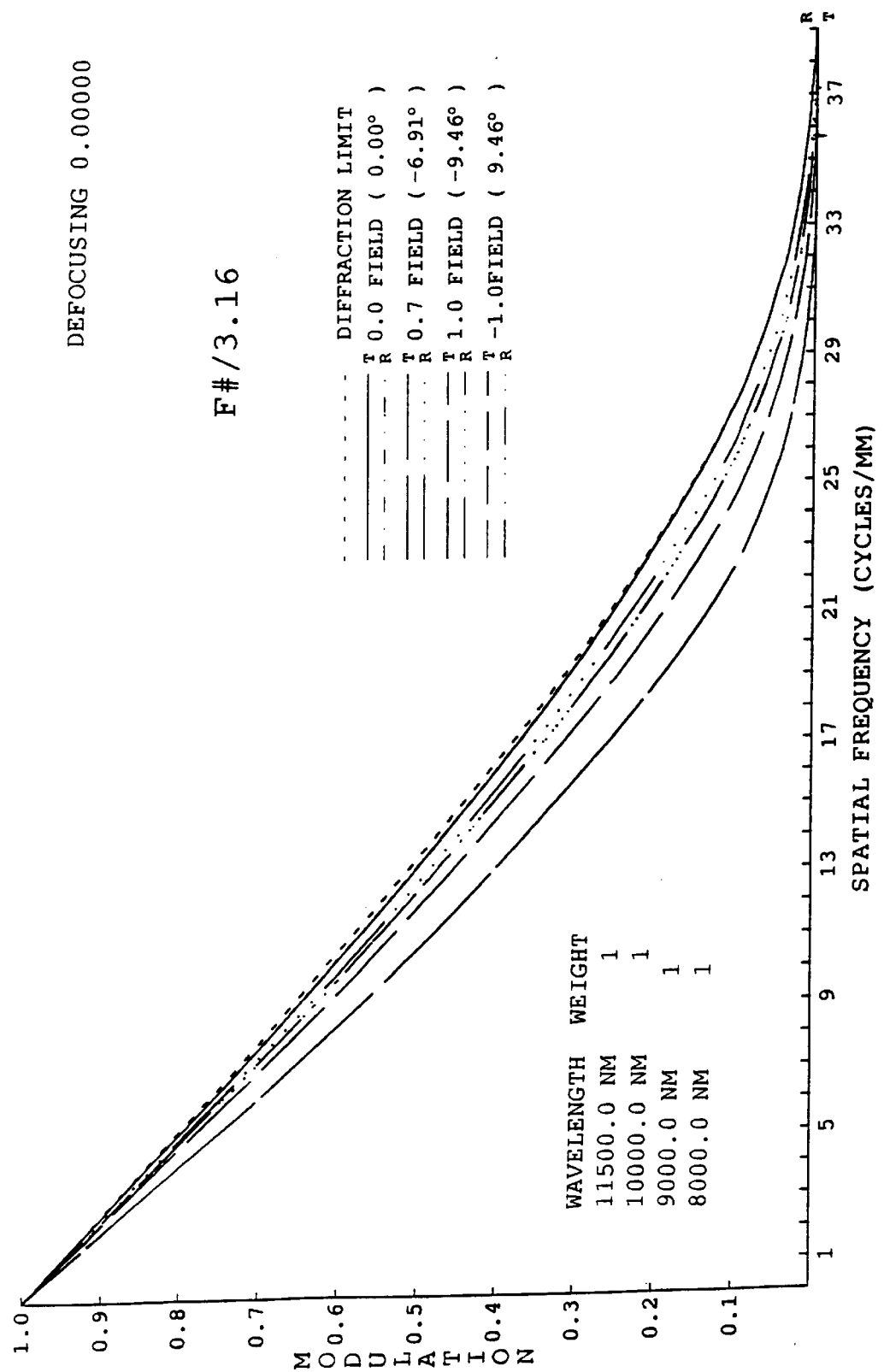
FIG. 7 shows the Modulation Transfer Function (MTF) for the air kit assembly stopped to a speed of f/3.16.

FIG. 7 shows the Modulation Transfer Function (MTF) optical resolution performance of the airkit at F#/3.16. As compared with the previous MTF plot, the values are nearly diffraction limited over the entire FOV, although the horizontal scale in line pairs per millimeter is different.

Figure 8:
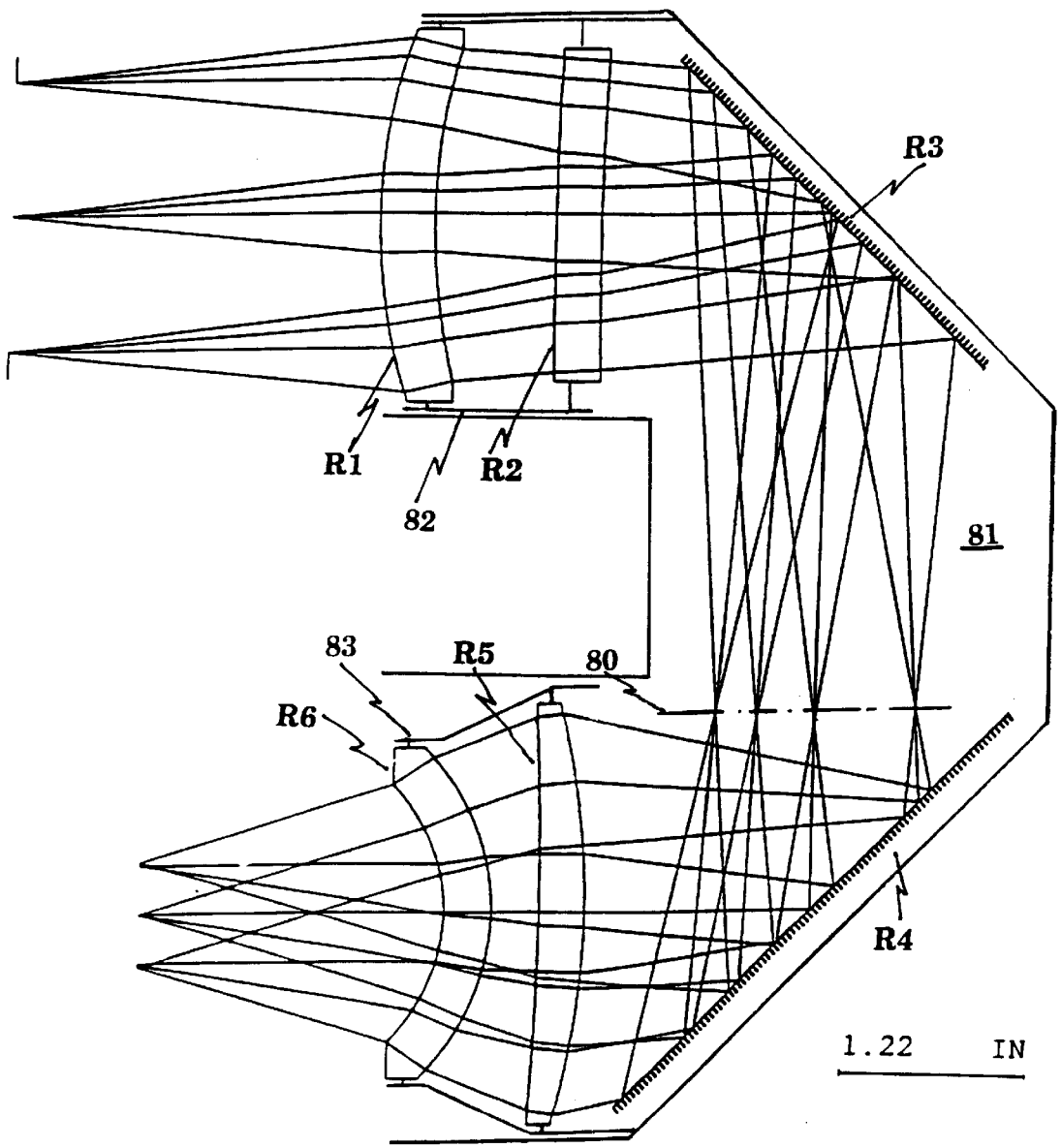
FIG. 8 shows a ray trace diagram of the optical path through an assembly of relay lenses placed in the optical path ahead of the airkit to provide an afocal with a medium FOV.

FIG. 8 shows a refractive Targeting Medium FOV (MFOV) relay afocal optical layout and its intermediate focal plane 80. Some FLIR accessories require windows that partially enclose the active region around this focal plane, e.g. power limiting devices. The existing refracting lens elements R2 and R5 themselves can be used as windows, or new ones preferably without optical power, may be inserted if desired. The remainder of the active region is enclosed by an opaque relay housing 81 that supports elements R1–R6. Elements R1 and R2 form a positive power air-spaced doublet which receives collimated light, if not directly from a target, from either a narrow FOV reflective afocal to (NFOV), an MFOV bypass mirror, or a Wide FOV afocal (WFOV) and a bypass mirror, which will be in combinations to be described presently. Fold mirror elements R3 and R4 bend the optical axis into short segments to reduce maximum dimension of the relay housing. These mirrors may also form part of the enclosure for the high quality intermediate focal plane 80. Elements R5 and R6 are a re-collimating lens pair, which form an external exit pupil to match the entrance pupil of the airkit optics and scanner. Only element R6 is made of ZnSe in order to correct chromatic aberrations, the other lenses are made of Germanium. A combination of GaAs and ZnS lens materials may be substituted and re-optimized, if desired. Using the specifications from Table III, at the end of this specification this relay afocal is an inverting afocal with 2.78× magnifying power, a nominal input aperture of 1.75 inches, and a minimum input field of view of ±6.2 degrees. The above table does not include the optional cell windows that may be used to surround the intermediate focal plane. The cell windows may be flat, or may have mild aspheric power to offset any small aberrations induced by the window insertion. Not shown with this data is an MFOV bypass mirror, which directs radiation coming in through the turret window directly into the relay afocal, thus bypassing the reflective narrow FOV afocal and resulting in an effective Medium FOV for the sensor system. Range focusing may be accomplished in the relay afocal by moving either or both pairs of lens elements on remote controlled motorized slides 82 and 83 attached to the relay housing. The afocal design may be scaled to other aperture diameters and magnifying powers as desired. Like the airkit an electrical harness on the helicopter provides power and control by the aircraft crew to this relay afocal.

Figure 9:
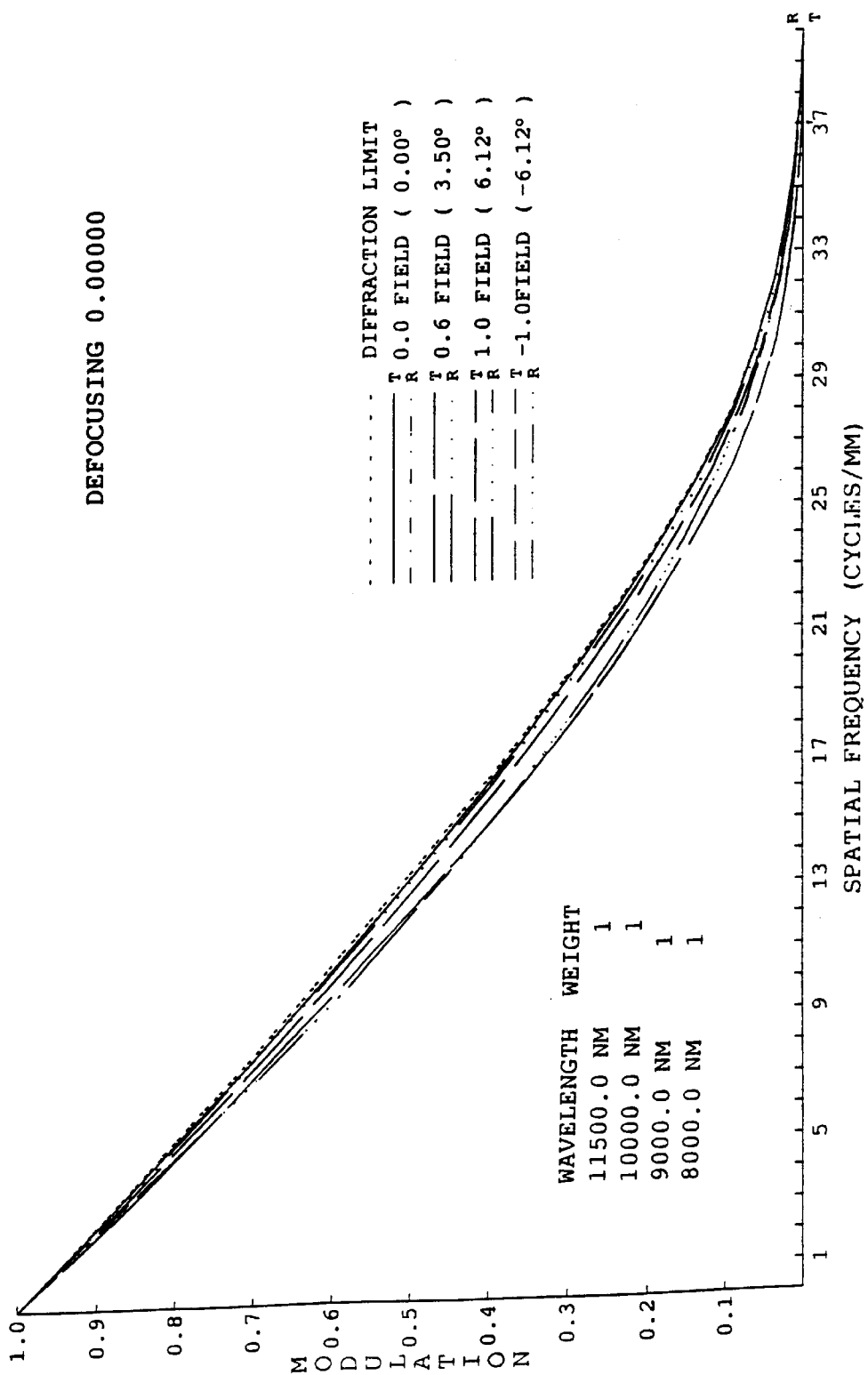
FIG. 9 shows the Modulation Transfer Function (MTF) for the relay lenses.

FIG. 9 shows the MTF optical resolution performance of a 2.78× Targeting Relay afocal, as above, over the field of view. Resolution is expected to be near diffraction limited in all cases.

Figure 10:
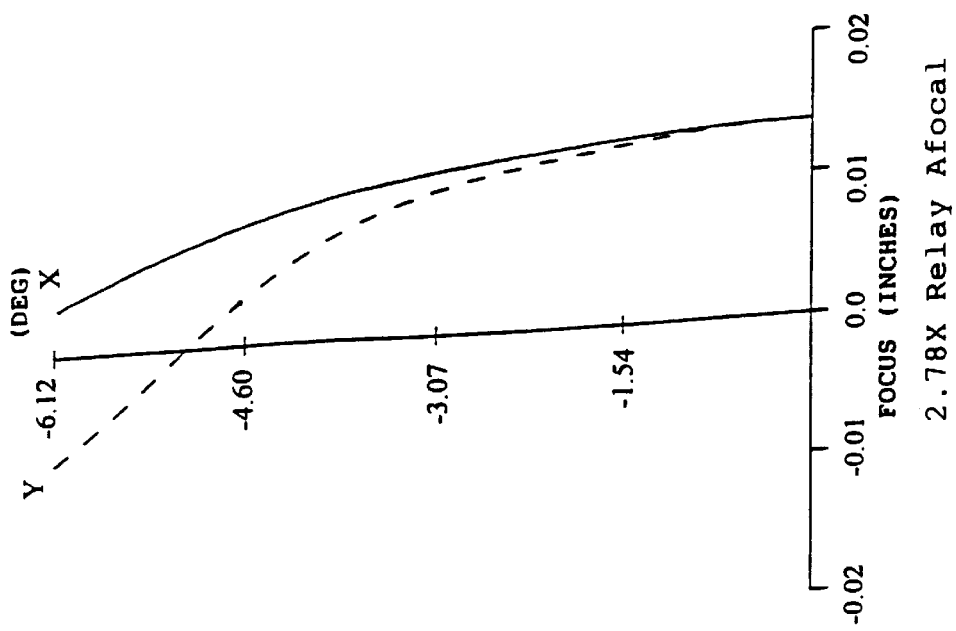
FIG. 10 shows an astigmatic field curve for the relay lenses.

FIG. 10 shows the astigamtic focus shift plot for the Relay afocal. The astigmatism is not enough to cause any substantial MTF degradation.

Figure 11:
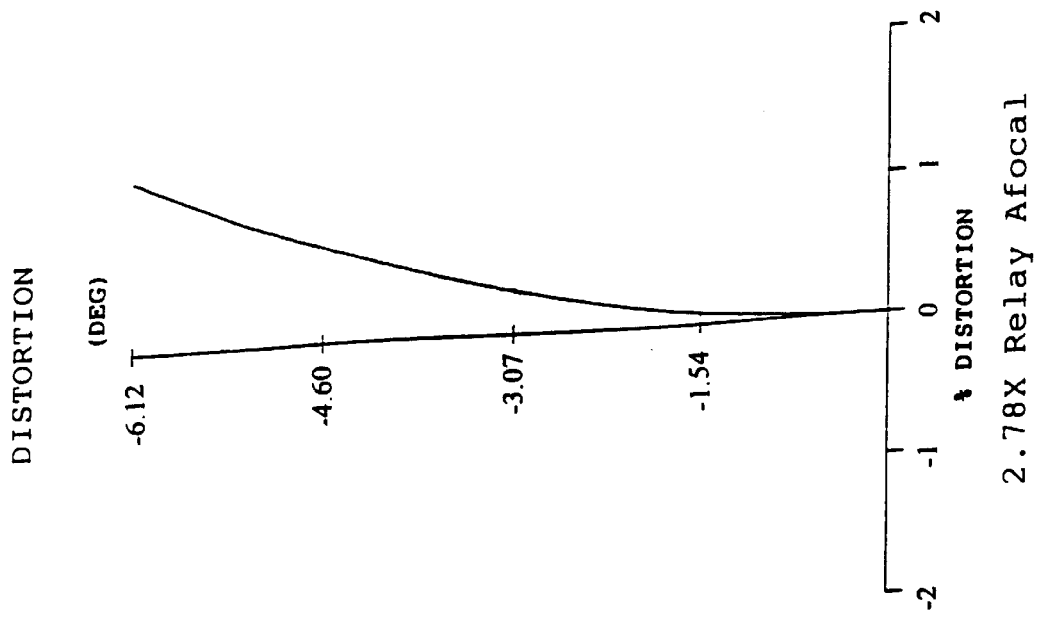
FIG. 11 shows a plot of the distortion curve for the relay lenses.

FIG. 11 shows the distortion plot for the relay afocal, distortion is less than 2% at the edge of the field.

FIG. 12 shows a targeting reflective narrow field primary afocal optical layout. This afocal is comprised of three powered off-axis mirrors, first and second powered elements N1, N2, and a third powered element N4, as well as a flat fold mirror N3 for compactness. Using the specifications from Table V, at the end of this specification, this afocal provides a nominal 4.02× magnifying power over an unobscured aperture of a minimum diameter of 6.98", a reflection focal plane 120 after the fold mirror element N3, and an accessible exit pupil several inches away from the tertiary mirror element N4. The acceptance field of view is no less than ±1.53 degrees. The afocal design may be scaled to other aperture diameters and magnifying powers as desired. The output of this afocal is directed into the relay afocal, which then directs optical radiation into the airkit optics where it comes to a final focus on the detector.

Figure 13:
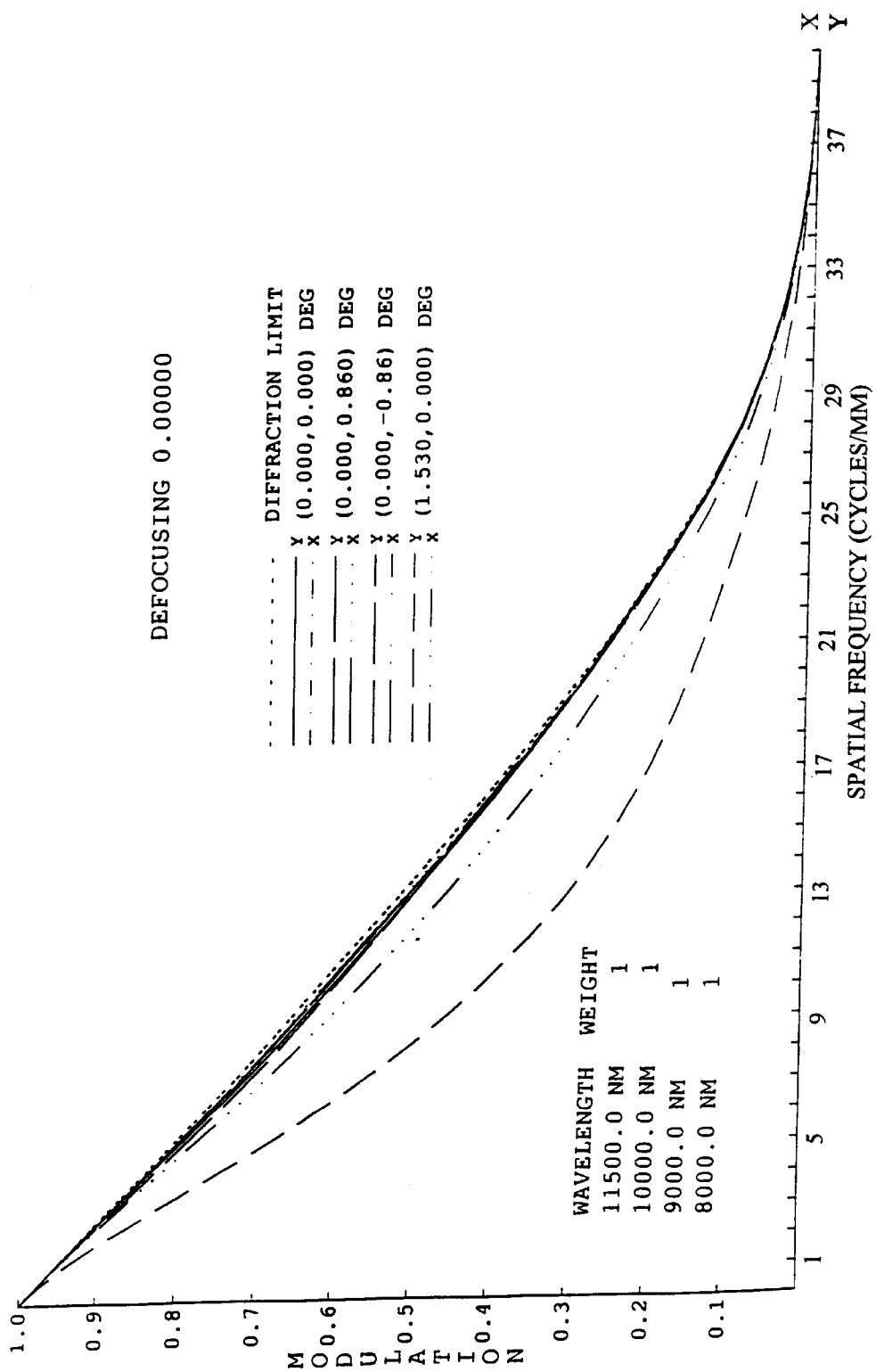
FIG. 13 shows the Modulation Transfer Function (MTF) for the narrow FOV afocal above.

FIG. 13 shows the MTF optical resolution performance of the above NFOV afocal over a 16:9 aspect ratio FOV. Note that the nature of reflective optics inherently eliminates chromatic aberration, so that this design will provide similar MTF response even down to visible wavelengths. However, as noted above, with the smaller wavelengths the surface finish must be kept smooth to within a fraction of a to wavelength, and some form of overcoating is often necessary during fabrication.

FIG. 14 shows astigmatic focus shift plot for the NFOV afocal. The high astigmatism at the edge of the field poses a practical limit to the MTF of this design.

FIG. 15 shows the distortion plot for the NFOV afocal. Although the distortion is calculated to be about 5% near the optical axis, the actual effect on the image is not noticeable. This is because distortion is defined as a fraction of the actual image height to the theoretical, and near the axis the image height is so minuscule that 5% is not a great linear dimension in the focal plane.

Figure 16:
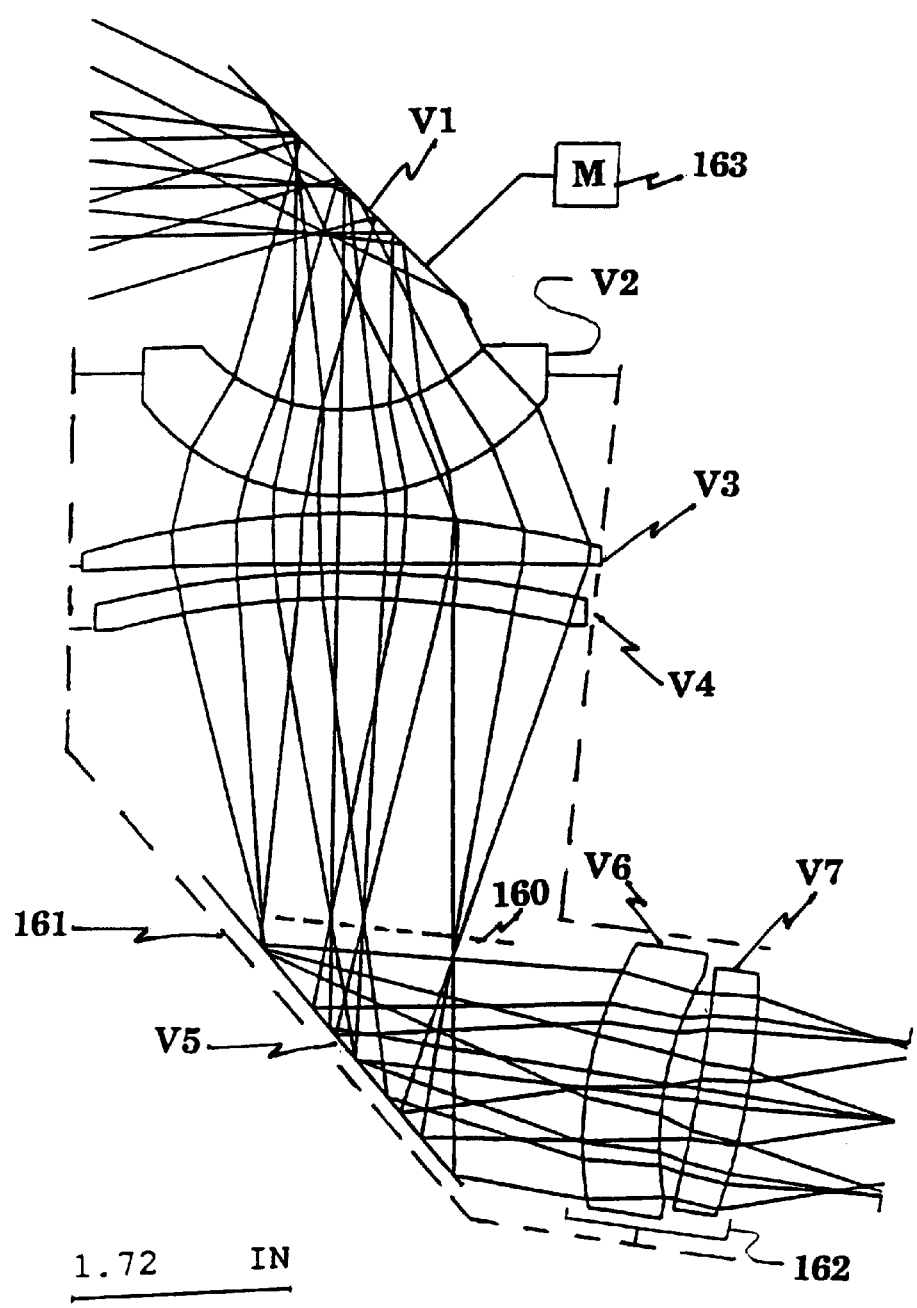
FIG. 16 shows a ray trace diagram of the optical path through a navigational afocal lens having a wide FOV which can be placed in the optical path ahead of the airkit and relay lenses.

FIG. 16 shows optical ray traces for a wide field of view navigation afocal and elevation mirror for the pilot's turret 12 in FIG. 1, which has a horizontal floor plate. This optical assembly combines with the airkit, the SADA navigational detector focal plane sensor array and its cooler to provide a complete wide FOV navigation FLIR sensor. This sensor does not use the relay MFOV described in FIG. 8 or the reflective afocal in FIG. 12. Element V1 is a simple elevation fold mirror, which attaches to a set of moveable gimbals conventionally included in the pilot's turret for nodding in the vertical direction. This elevation mirror allows a range of mechanical tilt motion from horizontal of at least ±45 degrees. The entrance pupil of the afocal optics which follow it is placed near the center of rotation of the mirror in order to minimize its size. This mirror may be fabricated as long as desired in the horizontal direction, e.g. two or more times its vertical width, which makes it specially useful with a parallel sensor, such as an intensified camera, which can be mounted next to the FLIR.

Elements V2, V3, and V4 form a positive lens group which brings incoming light to a focus at an intermediate focal plane 160. Fold mirror element V5 is positioned such that the intermediate focal plane occurs in air space only. Since the WFOV afocal is designed for a 30×53.3 degree FOV, the vertical height of the mirror may be somewhat less than the lens diameters, which are shown at full diameter for the full horizontal FOV. Element V5 may also be used as a vertical interlace mirror, if desired. Lens elements V6 and V7 recollimate the light, and form an external exit pupil, which matches the pupil on the scanner mirror in the airkit optics. With this arrangement, the airkit optics' aperture stop in the dewar serves as the aperture stop for the entire sensor. All of the elements are supported in an afocal housing 161. The axle of mirror V1 is attached to the shaft of a motor 163 mounted on the shroud of the pilot's navigation turret 12 or housing 161 to provide remote control of the vertical FOV. If range focus is desired in this navigation afocal, elements V6 and V7 may be affixed to a motorized slide 163, also mounted on the afocal housing, for remote control of their axial position. The lens materials are chosen to be germanium (Ge) and zinc selenide (ZnSe) to achieve color aberration correction, although alternate material pairs such as GaAs and ZnS may also provide similar performance and package. A single aspheric surface on each of the elements except V3 provides excellent aberration correction through the exit pupil of the afocal.

Using the specifications from Table II, at the end of this specification this afocal provides 0.62× magnification power, and acceptance field of view of 30×53.3 degrees, near diffraction limited resolution, and minimal <2% distortion. Included in the table are the elevation mirror and wide FOV afocal with its fold mirror. These elements when combined with the airkit form a complete WFOV Navigation optical sensor system. In some applications, the host sensor platform, e.g. the pilot's turret 12, may require a dome window over the front optics aperture. In this case, the afocal design shown here can be slightly modified to account for this without significant impact to the overall package.

Figure 17:
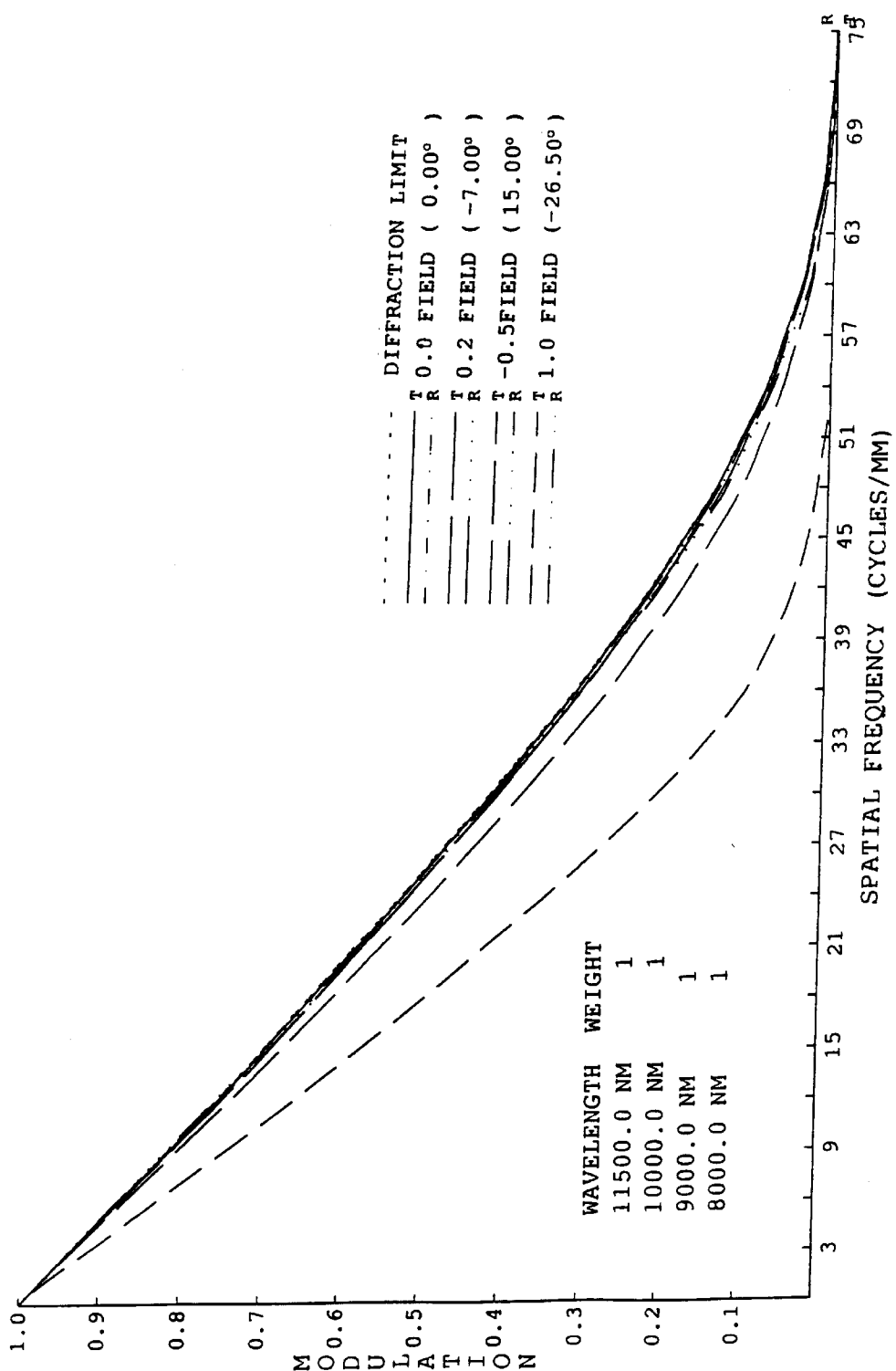
FIG. 17 shows the Modulation Transfer Function (MTF) for the navigational afocal above.

FIG. 17 shows the MTF resolution for the navigation afocal over a 16:9 aspect field of view. Due to astigmatism, resolution at the far edge of the field is compromised slightly.

FIG. 18 shows the astigmatic focus shift plot for navigation afocal. The astigmatic plot shows the reason for the drop in MTF at the edge of the field.

FIG. 19 shows the distortion plot for navigation afocal. Distortion is under 2% for the entire FOV.

Figure 20:
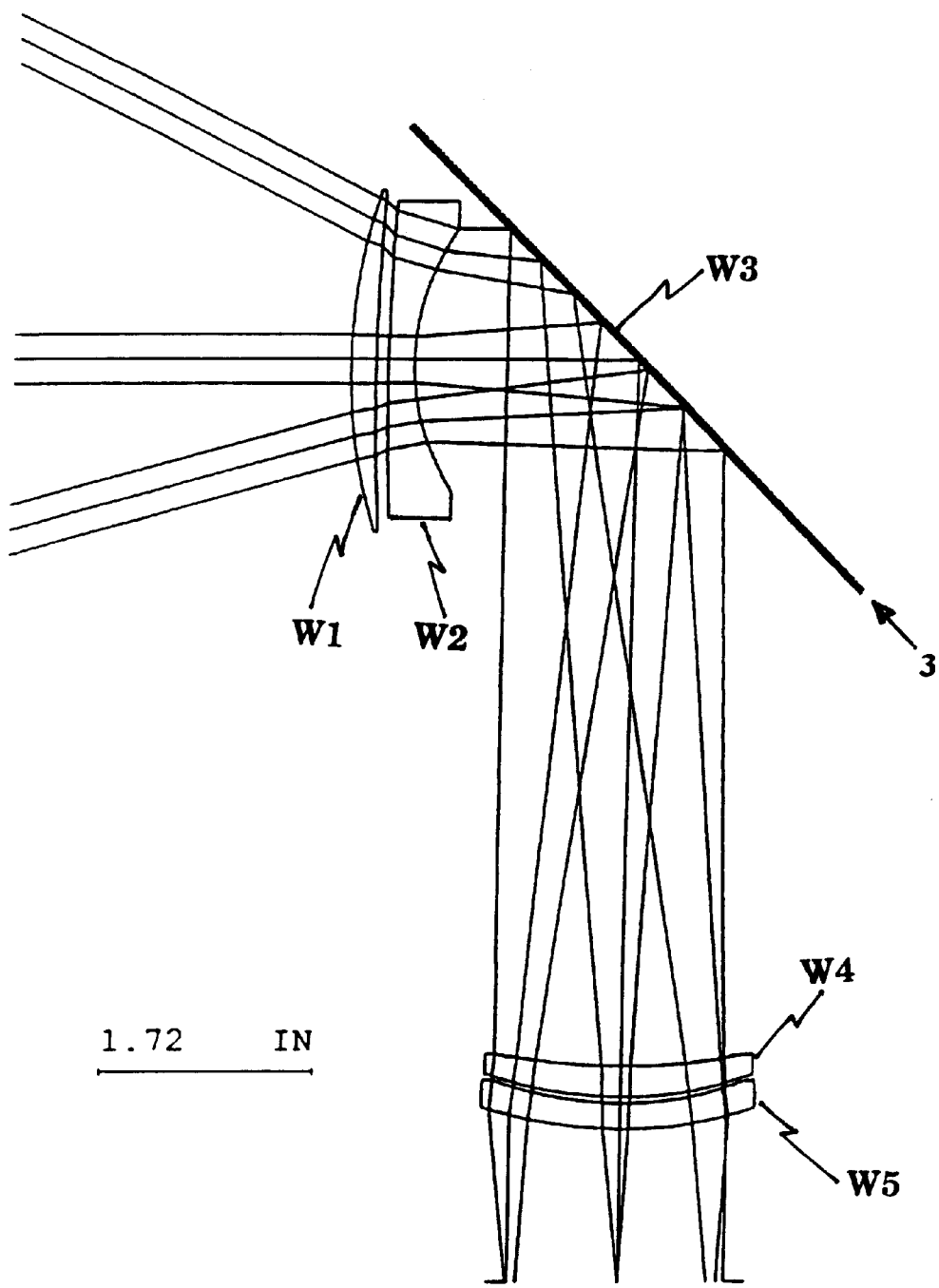
FIG. 20 shows a ray trace diagram of the optical path through a wide FOV targeting afocal lens which can be placed in the optical path ahead of the airkit and relay lenses.

FIG. 20 shows a targeting (WFOV); afocal optical layout. This afocal is a non-inverting Galilean form, using a long focal length positive lens pair with elements W1 and W2 followed by the MFOV bypass mirror W3, and then a negative lens pair with elements W4 and W5. Element W1 receives optical radiation directly from the scene, or perhaps through a flat window. . Using the specifications from Table IV at the end of this specification, this afocal provides reverse magnifying power of 0.22× in order to widen the FOV as seen by the detector/scanner for a minimum 30 degrees vertical by 53.S degrees horizontal. The targeting wide FOV tandem afocal when combined with the MFOV bypass mirror W3, the relay afocal, and the airkit optics forms the complete WFOV targeting sensor. As will be seen, the WFOV afocal shares the bypass mirror with the MFOV for convenience, although it is possible to use two smaller separate fold mirrors, if desired. To eliminate problems with thermal variation, there are no germanium elements in this design.

Figure 21:
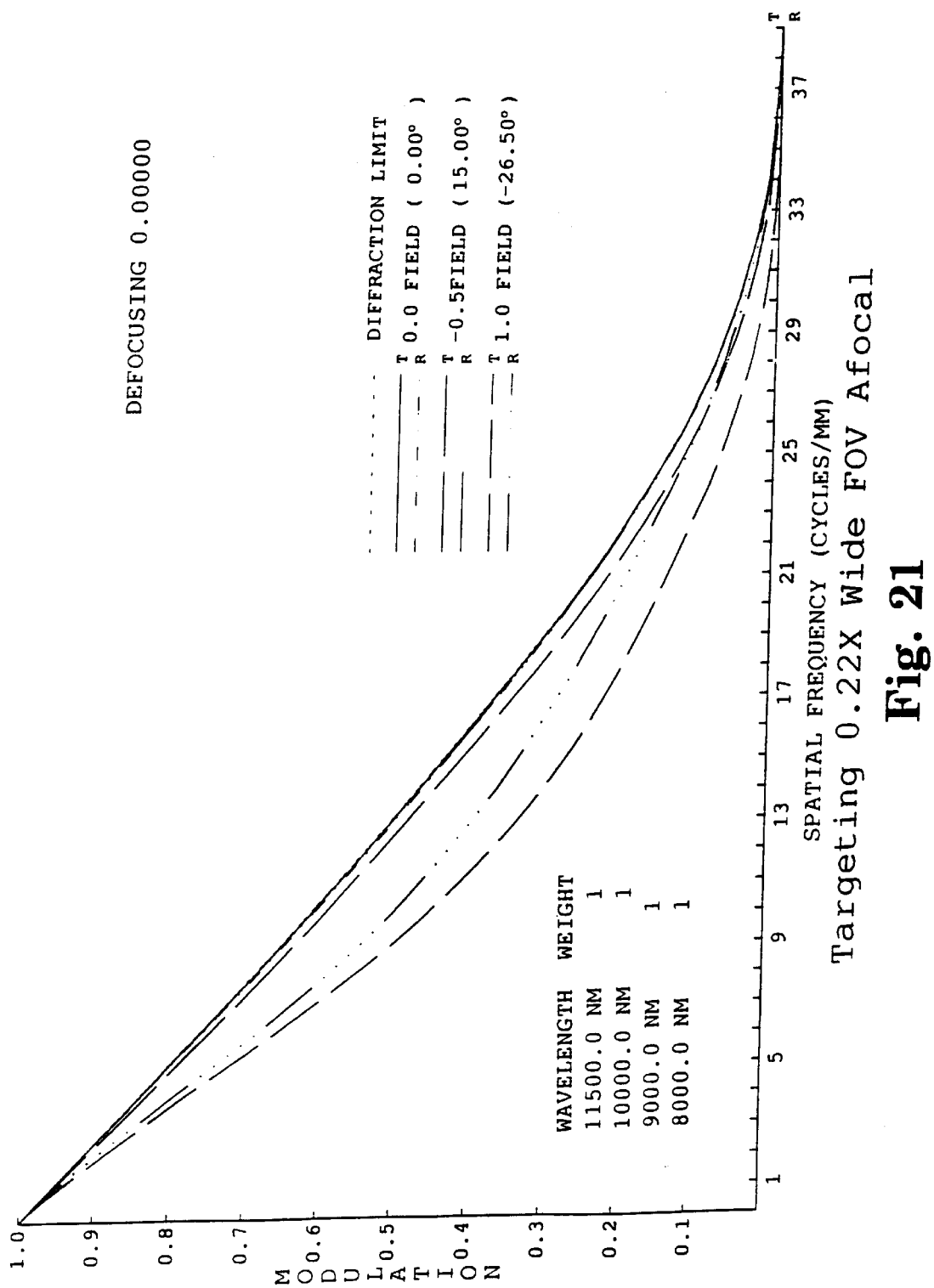
FIG. 21 shows the Modulation Transfer Function (MTF) for the wide FOV targeting afocal above.

FIG. 21 shows the MTF optical resolution performance of the WFOV afocal over the full field of view. Resolution does fall off near the edges, but this is largely due to vignetting of the pupil aperture caused by the geometry of large angle FOV's.

Figures 22, 23:
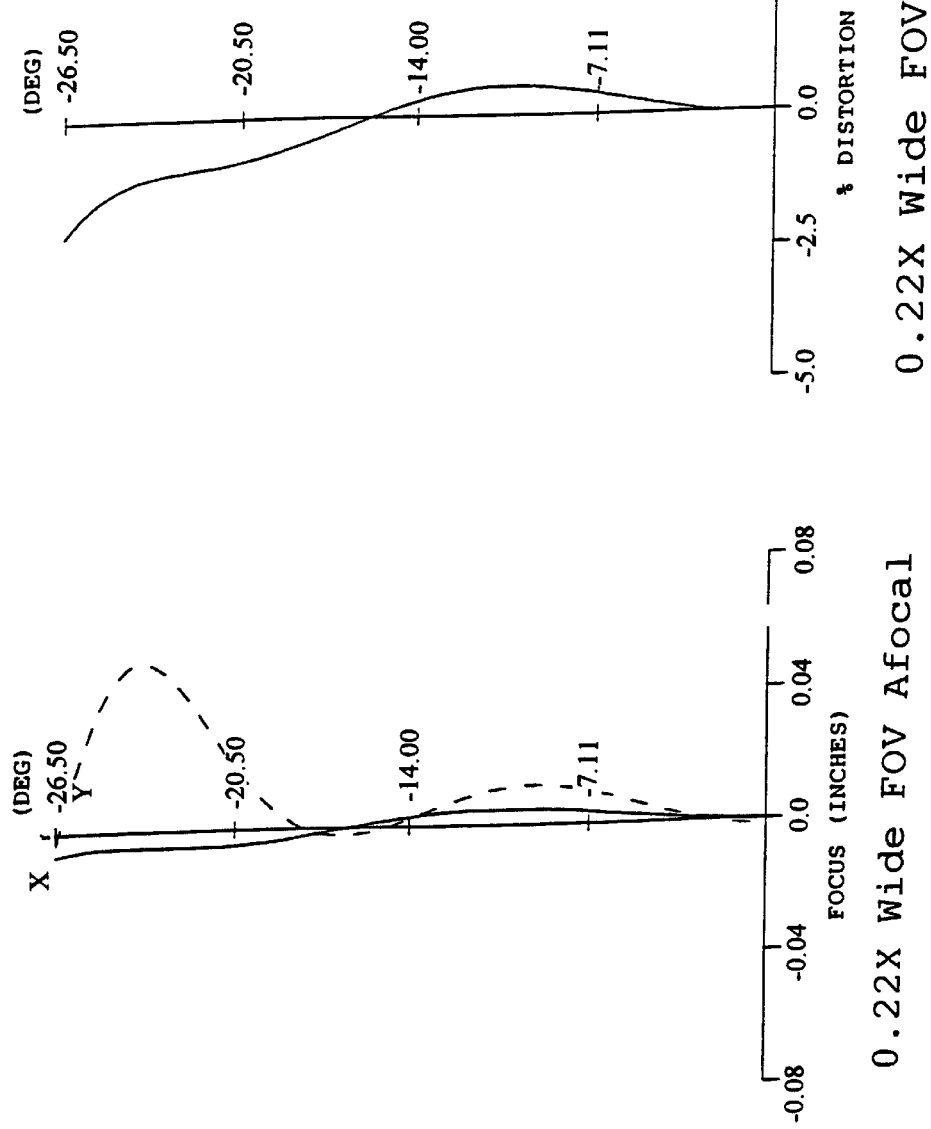
FIG. 22 shows an astigmatic field curve for the wide FOV targeting afocal above.
FIG. 23 shows a distortion curve for the wide FOV targeting afocal above.

FIG. 22 shows the astigmatic focus shift plot for the WFOV afocal. Astigmatism is well controlled throughout most of the field.

FIG. 23 shows the distortion plot for the WFOV afocal. Distortion is on the order of 2% at the far edge of the field.

Figure 24:
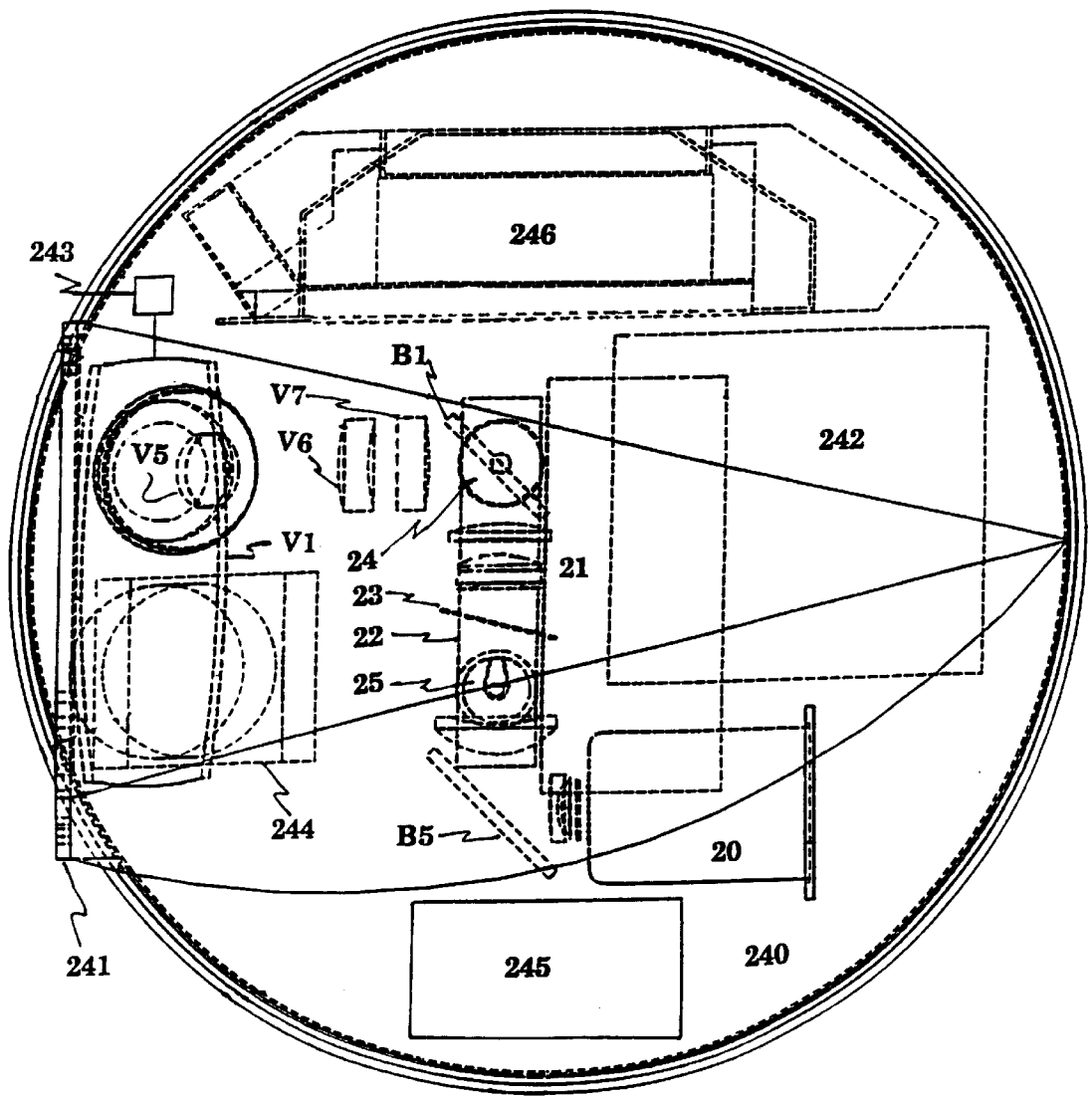
FIG. 24 shows a phantom top view of the turret 12 of FIG. 1, through which can be seen a low resolution FLIR system using the optical systems from FIGS. 2 and 16 above.

FIG. 24 shows a phantom top view of a pilot's navigation turret for the Apache aircraft with the dewar 20 and optical components 22–25, B1–B5, and V2V7 are mounted directly on the floor plate 240. Components V2–V4 are more clearly shown in the next drawing figure. The airkit is positioned behind the navigation wide field of view (WFOV) afocal optical assembly described at FIG. 16. The WFOV components V5–V7 are also mounted on the floor plate, so that their optic axis as well as that of the airkit lies substantially in a common optic plane, which is parallel to the floor plate and minimally spaced therefrom. The axis segment of components V5–V7 extends normally from the main segment of the airkit, collinear with the input axis segment of the airkit, to the folding mirror V5 near the plane of the turret window 241.

The circularly cylindrical cooler 21 is arranged with its axis above and parallel to the optic plane as well as parallel to the plane of the input window. One end of the cooler projects over the dewar. A first stack of electronic packages, like package 242, to control the imaging components and format the image data is mounted on the floor plate below the cooler. This arrangement also happens to satisfy the volume of the Comanche pilot's turret, as well. An elevation mirror V1, which provides a preselected vertical shiftng of the FOV, is mounted on a motorized axle 243, parallel to the plane of the window and the floor plate, just behind the input window of the turret at the top of the shroud. Less than half of the elevation mirror covers the folding mirror so that room is deliberately left available under the remaining portion to facilitate integration with another sensor, such as a WFOV camera 244 equipped with an image intensifier, that images in the visible and near infrared spectrums. Space is also available between the dewar and turret wall at one end of the airkit for an electronics package 245 for the image intensifier in the camera.

An even larger space is available at the opposite end of the airkit for a cage 246 containing additional, platform specific electronics packages to service other equipment and generic functions within the turret, e.g. the motors that rotate the turret and its elevation mirror. All of these packages are intercoupled to one another, to the FLIR, to the camera, to power sources and to aircraft pilot or gunner control panels by means of prewired harnesses, according to practices well known in the electronic servicing art.

Figure 25:
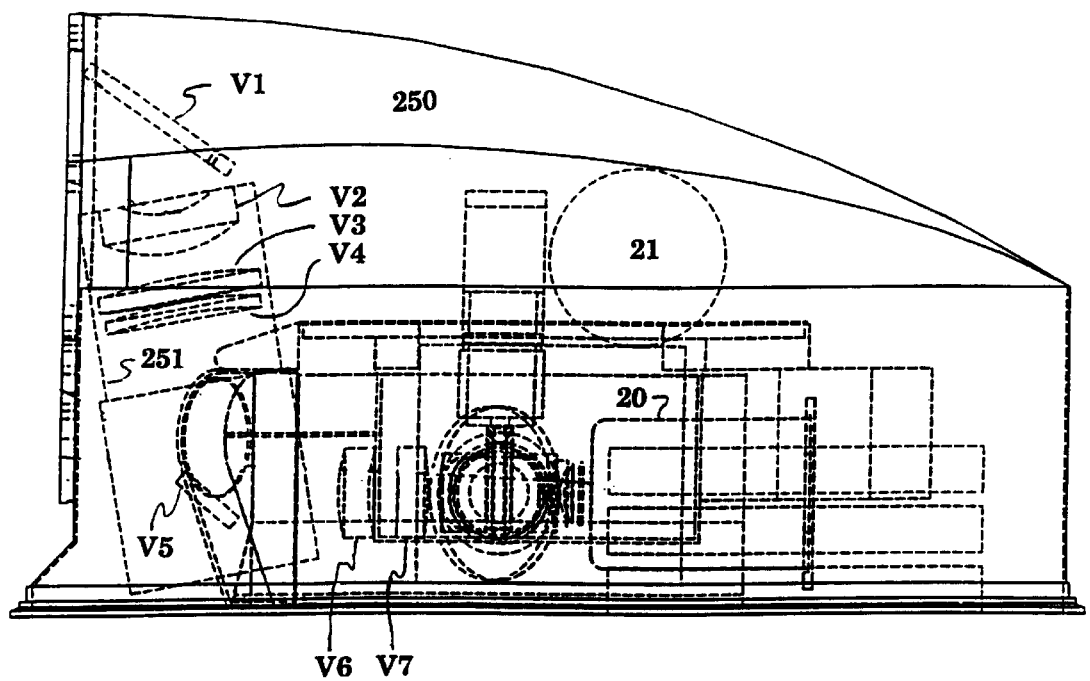
FIG. 25 shows a phantom side view of the turret in FIG. 24.

FIG. 25 shows a side view of the turret in FIG. 24 and a new taller shroud 250. As indicated the airkit lies flat along the floor plate to keep the overall sensor height minimal. The optic axis of the WFOV afocal is folded by mirror V5 normal to the axis of elevation mirror V1 and elements V2–V4 are located on the nearly vertical axis segment between mirrors V1 and V5. Elements V2–V5 are mounted in a housing platform 251 that is vertically secured to the floor plate. Elements V6 and V7 are mounted in a similar housing mounted with its axis parallel to the floor plate. The Intensified Camera (I^2 CCD) is shown as reference; its dimensions match an off-the-shelf commercially available product.

Figure 26:
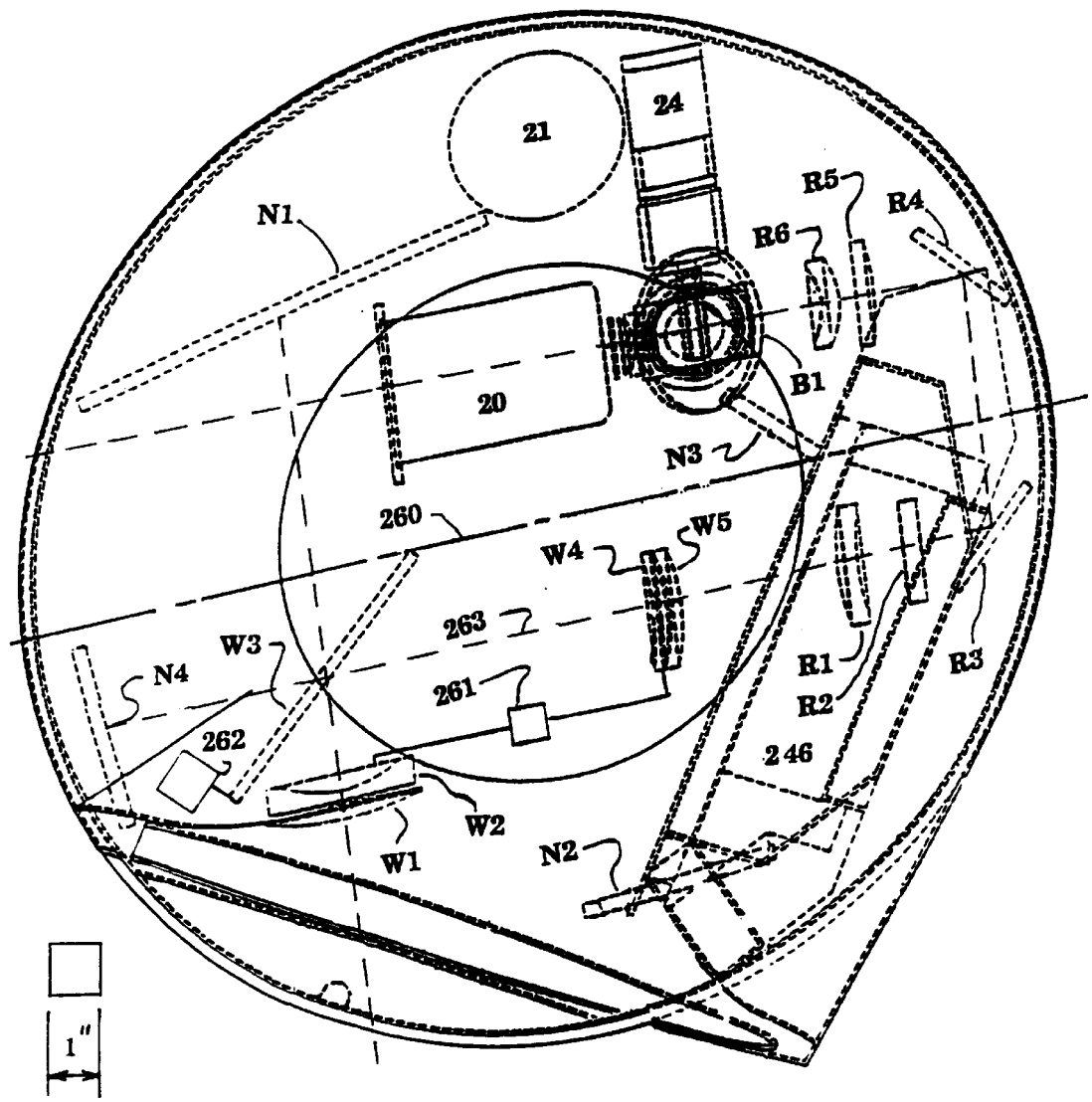
FIG. 26 shows a top view of the turret 11 of FIG. 1, through which can be seen a high resolution complex targeting FLIR system using the optical systems from FIGS. 2, 8, 12 and 20 above.

FIG. 26 shows a phantom top view of an overall layout for the complex, three field of view (FOV) targeting sensor platform, complete with first order optical parameters indicating FOV, kit location, afocal locations, and switch mechanisms. The last segment 26C of the optical axis is aligned parallel with a diametrical reference line 260 that tilts away from the window at its right end to form a 30° angle. The airkit in its rigid package is integrated into the three FOV targeting sight with its main segment normal to the floor plate and the last segment near the floor plate. This requires no modification, other than the placement of the electronics cage 246 which has a flexible wiring harness, and the substitution of the SADA targeting detector focal plane array, dewar and cooler, which are physically the same size as in the navigation kit.

The airkit is placed about as near to the circumference of the floor plate as possible. The relay kit components R1–R5 are arranged with the input and output segments parallel to the reference diameter and the output segment collinear with the airkit end portion of the output segment. Mirror W3 is arranged to deflect the optic axis 90° at its center and the distance between mirrors R3 and R4 is adjusted to place this mirror as near the window as possible, with lenses W1 and W2 on the window segment. Lenses W4 and W5 are mounted collinear to the relay input segment nearer lens R1 than mirror W3. A motorized lens switch assembly mounts W1, W2, W4 and W5 to the floor plate and removes them entirely from the optical path in response to a medium view electronic signal from the aircraft. Likewise a motorized mirror switch assembly mounts mirror_W3 to the floor plate and removes it entirely from the optical path in iw response to a narrow view electronic signal from the aircraft. This extends the window segment to the center of mirror N1 and the relay input segment to the center of mirror N4 and the optical axis is completed by first, second and third reflective segments (not indicated in the drawing) serially joining the centers of the mirrors N1–N4. For each of Elements N1, N2, and N4, the used portion of the mirror aperture is only a section whose center is vertically displaced from the geometric profile of a much larger diameter mirror. Thus the active areas of the off-axis mirrors retain bilateral symmetry, but are not rotationally symmetric. In actual fabrication, the geometric construct is often loaded into a computerized tool cutting system, and only the used mirror segments are actually fabricated. To use any of the mirrors, described above, for wavelengths other than the 8–12 micron IR spectrum; e.g. shorter wavelengths useable with the refractive components described above, it may be necessary to overcoat the mirrors with a smooth layer of nickel or something similar.

Figure 27:
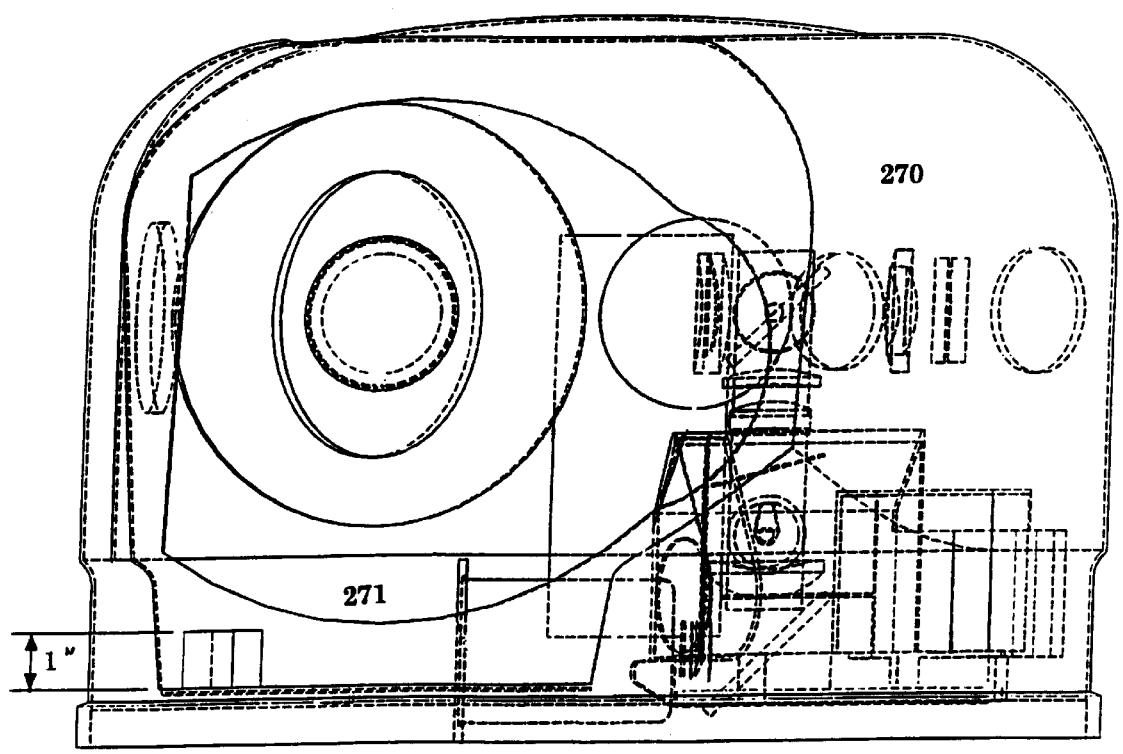
FIG. 27 shows a phantom side view of the turret in FIG. 26.

FIG. 27 shows a head-on view of the targeting sensor, with a viewpoint looking straight along the window segment through the angled window. The narrow FOV reflective afocal aperture is not centered behind the current Apache TADS window for packaging reasons, but there is no penalty in performance. The electronic packages to process the FLIR output are not shown, but the space 270 above the medium FOV relay kit and the space 271 below the narrow and wide FOV kits is available to accommodate them.

Optical Data Tables

The following notes pertain to Tables Ia–Vc that follow
Positive radius indicates the center of curvature is to the right.
Negative radius indicates the center of curvature is to the left.
Dimensions are given in inches.
Thickness is axial distance to next surface.
Image diameters are paraxial values, they are not ray traced values.

The material GERMLW is germanium that is optimized for far-infrared.

A decenter defines a new coordinate system (displaced and/or rotated), in which subsequent surfaces are defined. Surfaces following a decenter are aligned on the local mechanical axis (z-axis) of the new coordinate system. The new mechanical axis remains in use until changed by another decenter. The order in which displacements and tilts are applied on a given surface is specified using different decenter types and these generate different new coordinate systems. The systems used here are explained below where alpha, beta, and gamma are expressed in degrees.

DECENTERING CONSTANT KEY:

| TYPE | TRAILING CODE | ORDER |
|---|---|---|
| Decenter |  | Displace (X, Y, Z) |
|  |  | Tilt ($\alpha, \beta, \gamma$) |
|  |  | Refract at surface |
|  |  | Thickness to next surface |
| Decenter & Bend | Bend | Decenter (X, Y, Z, $\alpha, \beta, \gamma$) |
|  |  | Reflect at surface |

-continued
DECENTERING CONSTANT KEY:

| TYPE | TRAILING CODE | ORDER |
|---|---|---|
|  |  | Bend ($\alpha, \beta, \gamma$) |
|  |  | Thickness to next surface |

REFERENCE WAVELENGTH 10,000 nm

SPECTRAL REGION=8000.0–11,000 nm

FFL is measured from the first surface.

BFL is measured from the last surface.

Axial Aspheric displacement z is derived from the formula:

$$z = \frac{(CURV)Y^2}{1 + (1 - (1+K)(CURV)^2 Y^2)^{1/2}} + (A)Y^4 + (B)Y^6 + (C)Y^8 + (D)Y^{10}$$

TABLE I

Basic Airkit
BASIC AIRKIT ASSEMBLY

| ELEMENT NO. | RADIUS OF CURV. FRONT | RADIUS OF CURV. BACK | THICK AXIAL | APERTURE FRONT | APERTURE BACK | GLASS TYPE |
|---|---|---|---|---|---|---|
| OBJECT | INF |  | INFINITY | 2.2000 |  |  |
|  |  |  | 3.0000 |  |  |  |
|  |  |  | DECENTER (1) |  |  |  |
| 1 | INF |  | 0.0000 | 2.0365 |  |  |
|  |  |  |  | 1.2694 |  | REFL |
|  |  |  | −1.0000 |  |  |  |
| 2 | −2.7628 CX | A(1) | −0.3192 | 1.5743 | 1.5165 | GaAs |
|  |  |  | −0.3027 |  |  |  |
| 3 | A (2) | −1.0455 CC | −0.4640 | 1.2560 | 0.9409 | GaAs |
|  |  |  | −0.3000 |  |  |  |
|  |  |  |  | 1.2155 |  |  |
|  |  |  | −1.0000 |  |  |  |
|  |  |  |  | 1.2155 |  |  |
|  |  |  | −1.0525 |  |  |  |
| 4 | A (3) | 1.4959 CX | −0.5134 | 1.8860 | 2.2077 | GaAs |
|  |  |  | −0.8931 |  |  |  |
|  |  |  | DECENTER (2) |  |  |  |
| 5 |  | INF | 0.0000 | 2.9038 |  | REFL |
|  |  |  |  | 1.6005 |  |  |
|  |  |  | 0.8973 |  |  |  |
|  |  |  |  | 1.2036 |  |  |
|  |  |  | 0.0000 |  |  |  |
| 6 | A (4) | 0.7547 CC | 0.0929 | 1.1548 | 1.0220 | ZnS |
|  |  |  | 0.0769 |  |  |  |
| 7 | 0.9324 CX | A (5) | 0.1322 | 1.0378 | 1.0155 | GaAs |
|  |  |  | 0.0953 |  |  |  |
|  |  |  |  | 0.9228 |  |  |
|  |  |  | 0.0994 |  |  |  |
| 8 | INF | INF | 0.0400 | 0.7641 | 0.5723 | GERMLW |
|  |  |  | APERTURE STOP 0.5723 |  |  |  |
|  |  |  | 0.0915 |  |  |  |
|  |  |  |  | 0.6054 |  |  |
|  |  |  | 0.4000 |  |  |  |
| 9 | INF | INF | 0.0200 | 0.6136 | 0.6144 | GERMLW |
|  | IMAGE | IMAGE DISTANCE = INF | 0.3880 |  |  |  |
|  |  |  |  | 0.6630 |  |  |

TABLE II 0.62X Navigation Afocal
NAVIGATION FLIR 0.62X AFOCAL

| ELEMENT NUMBER | RADIUS OF CURV. FRONT | BACK | THICK AXIAL | APERTURE DIAM. FRONT | BACK | GLASS |
|---|---|---|---|---|---|---|
| OBJECT |  | INF | INFINITY |  |  |  |
|  |  |  |  | 2.6165 |  |  |
|  |  |  | 2.000 |  |  |  |
|  |  |  | DECENTER (1) |  |  |  |
| 1 |  | INF | 0.0000 | 2.4760 |  | REFL |
|  |  |  |  |  | 0.8779 |  |
|  |  |  | −1.7500 |  |  |  |
| 2 | A (1) | 1.9709 CX | −0.6750 | 2.1425 | 3.0011 | GERMLW |
|  |  |  | −0.1410 |  |  |  |
| 3 | −7.4470 CX | A (2) | −0.3943 | 3.8508 | 3.8145 | GERMLW |
|  |  |  | −0.0675 |  |  |  |
| 4 | −8.4086 CX | −7.3841 CC | −0.1996 | 3.6384 | 3.5206 | ZNSE |
|  |  |  | −0.3976 |  |  |  |
|  |  |  |  |  | 3.4025 |  |
|  |  |  | −1.2574 |  |  |  |
|  |  |  |  |  | 2.5985 |  |
|  |  |  | −1.6875 |  |  |  |
|  |  |  | DECENTER (2) |  |  |  |
| 5 |  | INF | 1.1465 | 2.9930 |  | REFL |
|  |  |  |  |  | 1.9239 |  |
|  |  |  | 0.8595 |  |  |  |
| 6 | 2.9725 CX | A (3) | 0.6000 | 1.9573 | 1.7294 | ZNSE |
|  |  |  | 0.2771 |  |  |  |
| 7 | A (4) | −5.1879 CX | 0.4070 | 1.7402 | 1.7818 | GERMLW |
|  |  |  | 1.2000 |  |  |  |
|  | APERTURE STOP |  |  | 1.2047 |  |  |
|  |  |  | 0.0000 |  |  |  |
|  |  |  |  |  | 1.2047 |  |
|  |  |  | 1.0000 |  |  |  |
|  |  |  |  |  | 1.6001 |  |
|  |  |  | 0.0000 |  |  |  |
|  |  |  |  |  | 1.6001 |  |
|  | IMAGE DISTANCE = |  | 1.9800 |  |  |  |
| IMAGE |  | INF |  | 1.2378 |  |  |

TABLE III 2.78X Relay Afocal
TARGETING FLIR. RELAY AFOCAL 2.78X

| ELEMENT NUMBER | RADIUS OF CURV. FRONT | BACK | THICK AXIAL | APERTURE DIA FRONT | BACK | GLASS |
|---|---|---|---|---|---|---|
| OBJECT |  | INF | INFINITY |  |  |  |
|  |  |  |  | 2.9294 |  |  |
|  |  |  | 3.0000 |  |  |  |
|  |  |  |  |  | 2.2861 |  |
|  |  |  | 2.5000 |  |  |  |
|  | APERTURE STOP |  |  | 1.7500 |  |  |
|  |  |  | 2.4000 |  |  |  |
| 1 | 3.5605 CX | A (1) | 0.3584 | 2.3058 | 2.1636 | GERMLW |
|  |  |  | 0.7715 |  |  |  |
| 2 | 27.1719 CX | A (2) | 0.3000 | 2.0375 | 2.0059 | GERMLW |
|  |  |  | 1.5000 |  |  |  |

TABLE III-continued 2.78X Relay Afocal
TARGETING FLIR. RELAY AFOCAL 2.78X

| ELEMENT | RADIUS OF CURV. | | THICK | APERTURE DIA | | |
|---|---|---|---|---|---|---|
| NUMBER | FRONT | BACK | AXIAL | FRONT | BACK | GLASS |
| | | | DECENTER (1) | | | |
| 3 | | INF | −4.2459 | 2.7235 | | REFL |
| | | | | 1.7442 | | |
| | | | −0.3000 | | | |
| | | | DECENTER (2) | | | |
| 4 | | INF | 0.0000 | 3.3904 | | REFL |
| | | | | 1.8750 | | |
| | | | 1.4765 | | | |
| 5 | 4.9235 CX | A (3) | 0.3000 | 2.5943 | 2.5432 | GERMLW |
| | | | 0.3000 | | | |
| 6 | 1.5115 CX | A (4) | 0.3000 | 2.0206 | 1.6698 | ZNSE |
| | | | 2.0000 | | | |
| | | | | 0.6872 | | |
| | IMAGE DISTANCE = | | 1.9800 | | | |
| IMAGE | | INF | | 1.1860 | | |

TABLE IV 0.22X WFOV Afocal
TARGETING WFOV FLIR 0.22X AFOCAL

| ELEMENT | RADIUS OF CURV. | | THICK | APERTURE DI | | |
|---|---|---|---|---|---|---|
| NUMBER | FRONT | BACK | AXIAL | FRONT | BACK | GLASS |
| OBJECT | | INF | INFINITY | | | |
| | | | | 5.4677 | | |
| | | | 2.7076 | | | |
| 1 | A (1) | 16.7105 CC | 0.2000 | 2.5708 | 2.5347 | ZNS |
| | | | 0.1000 | | | |
| 2 | 19.5635 CX | A (2) | 0.2000 | 2.3873 | 2.0838 | ZNSE |
| | | | 1.7500 | | | |
| | | | DECENTER (1) | | | |
| 3 | | 3443.0980 CX | −5.6100 | 5.0000 | | REFL |
| 4 | 5.1770 CC | 3.2409 CX | −0.2400 | 1.9778 | 2.0163 | ZNSE |
| | | | −0.0500 | | | |
| 5 | 2.9000 CC | 3.6077 CX | −0.2000 | 2.0032 | 2.0545 | |
| | | | −1.2000 | | | |
| | | | APERTURE STOP 1.7278 | | | |
| | | | −0.2000 | | | |
| | | | | 1.8818 | | |
| | IMAGE DISTANCE = | | −5.5000 | | | |
| IMAGE | | INF | | 1.2059 | | |

50

TABLE V

4.02X NFOV Afocal
TARGETING FLIR. NFOV REFLECTOR AFOCAL 4.02X

| ELEMENT NUMBER | RADIUS OF CURV. FRONT | RADIUS OF CURV. BACK | THICK AXIAL | APERTURE DIAM. FRONT | APERTURE DIAM. BACK | GLASS |
|---|---|---|---|---|---|---|
| OBJECT | | INF | INFINITY | | | |
| | | | 15.0000 | 7.8013 | | |
| | | | APERTURE STOP 7.0000 | | | |
| | | | 0.0000 | | 7.0000 | |
| | | | 2.0000 | | | |
| | | | DECENTER (1) | | | |
| 1 | A (1) | | −12.0000 | 24.0017 | | REFL |
| | | | DECENTER (2) | | | |
| 2 | A (2) | | 6.2000 | 9.4945 | 4.6549 | REFL |
| | | | 0.0000 | | | |
| | | | DECENTER (3) | | | |
| 3 | | INF | 0.0000 | 4.8035 | 4.6549 | REFL |
| 4 | A (3) | | −12.7500 10.9274 | 7.3199 | | REFL |
| | | | DECENTER (4) | | | |
| | | | 0.0000 | | 1.9399 1.9399 | |
| | | | 4.5000 | | 2.6147 | |
| | IMAGE DISTANCE = | | 5.4798 | | | |
| IMAGE | | INF | | 1.1710 | | |

The following table sets, the components of which are denoted as a, b=and c, provide constants for the optical systems in tables I–V, respectively. These are decentered systems. If elements with power are decentered or tilted, the first order properties are probably inadequate in describing the system characteristics. See Formula for axial aspheric thickness factor (Z) and Decentering Constant Key above.

TABLE Ic

Infinite Conjugates

EFL = −1.9801    SEMI-FIELD 9.4620
BFL = −0.3929    ANGLE =

TABLE Ia

Aspheric Constants

| ASPH. | CURV. | K | A | B | C | D |
|---|---|---|---|---|---|---|
| A(1) | −0.13844034 | 0.000000 | 1.36822E-02 | −1.98902E-02 | 2.80507E-02 | −1.46543E-02 |
| A(2) | −0.61172000 | 0.000000 | 2.67628E-02 | 2.85015E-02 | −7.57858E-02 | 1.41694E-01 |
| A(3) | 0.44629593 | 0.000000 | 7.49741E-02 | −2.51654E-02 | 4.47554E-02 | −2.23272E-02 |
| A(4) | 0.49500338 | 0.000000 | 3.49512E-01 | 4.98182E-02 | 6.06776E-01 | −2.20447E 00 |
| A(5) | 0.33999597 | 0.000000 | 1.95473E-01 | −1.19040E-01 | 1.30851E 00 | −5.11328E 00 |

TABLE Ib

Decentering Constants

| Const | X | Y | Z | ALPHA | BETA | GAMMA | |
|---|---|---|---|---|---|---|---|
| D(1) | 0.0000 | 0.0000 | 0.0000 | −45.0000 | 0.0000 | 0.0000 | (BEND) |
| D(2) | 0.0000 | 0.0000 | 0.0000 | 45.0000 | 0.0000 | 0.0000 | (BEND) |

TABLE Ic-continued

Infinite Conjugates

| | | | |
|---|---|---|---|
| FFL = | −1.8206 | ENTR PUPIL | 1.2000 |
| F/NO = | −1.6501 | DIAMETER = | |
| IMAGE DIST = | −0.3880 | DISTANCE = | 2.5874 |
| OAL = | −0.8995 | EXIT PUPIL | 0.5390 |
| PARAXIAL IMAGE HT = | 0.3300 | DIAMETER = DISTANCE = | −0.4965 |

TABLE IIA

Aspheric Constants

| ASP | CURV | K | A | B | C | D |
|---|---|---|---|---|---|---|
| A(1) | 0.70912806 | 0.000000 | −6.95382E-03 | −1.83275E-03 | 3.25615E-03 | −2.56332E-03 |
| A(2) | 0.00395909 | 0.000000 | −3.34114E-03 | 6.83473E-04 | −1.14754E-04 | 8.26091E-06 |
| A(3) | 0.39085202 | 0.000000 | −6.57826E-04 | 7.14177E-03 | −8.95620E-03 | 9.35884E-03 |
| A(4) | −0.07854628 | 0.000000 | 3.72747E-04 | 3.00446E-03 | −3.84031E-03 | 4.01772E-03 |

TABLE IIb

Decentering Constants

| DECENT | X | Y | Z | ALPHA | BETA | GAMMA | |
|---|---|---|---|---|---|---|---|
| D(1) | 0.0000 | 0.0000 | 0.0000 | 45.0000 | 0.0000 | 0.0000 | (BEND) |
| D(2) | 0.0000 | 0.0000 | 0.0000 | −50.0000 | 0.0000 | 0.0000 | (BEND) |

TABLE IIc

Infinite Conjugates

| | | | |
|---|---|---|---|
| EFL = | −1.2320 | SEMI-FIELD | 26.5000 |
| BFL = | 1.9799 | ANGLE = | |
| FFL = | 1.3630 | ENTR PUPIL | 0.7500 |
| F/NO = | −1.6427 | DIAMETER = | |
| IMAGE DIST = | 1.9800 | DISTANCE = | 1.7424 |
| OAL = | 0.9201 | EXIT PUPIL | 2.4353 |
| PARAXIAL IMAGE HT = | 0.6143 | DIAMETER = DISTANCE = | −2.0204 |

TABLE IIc

Infinite Conjugates

| | | | |
|---|---|---|---|
| EFL = | 5.4900 | SEMI-FIELD | |
| BFL = | 1.9937 | ANGLE = | 6.1200 |
| FFL = | −9.7683 | ENTR PUPIL | 1.7500 |

TABLE IIc-continued

Infinite Conjugates

| | | | |
|---|---|---|---|
| F/NO | −3.1371 | DIAMETER = | |
| IMAGE DIST = | 1.9800 | DISTANCE = | 5.5000 |
| OAL = | 10.6606 | EXIT PUPIL | 0.6292 |
| PARAXIAL | 0.5886 | DIAMETER = | |
| IMAGE HT = | | DISTANCE = | 0.0197 |

TABLE IIIa

Aspheric Constants

| ASP | CURV | K | A | B | C | D |
|---|---|---|---|---|---|---|
| A(1) | 0.24671034 | 0.000000 | −1.393S7E-03 | 1.76333E-03 | −2.21070E-03 | 8.55742E-04 |
| A(2) | 0.03611436 | 0.000000 | 2.26699E-03 | −1.09672E-03 | 2.24264E-03 | −1.14732E-03 |
| A(3) | 0.04460165 | 0.000000 | 2.53708E-03 | −3.44728E 04 | 2.10684E 04 | −6.17849E-05 |
| A(4) | 0.8546719 | 0.000000 | −1.52011E-03 | 3.64877E-03 | −1.20908E 02 | 7.49500E-03 |

TABLE IIIb

Decentering Constants

| DEC. | X | Y | Z | Alpha | Beta | Gamma | |
|---|---|---|---|---|---|---|---|
| D(1) | 0.0000 | 0.0000 | 0.0000 | 45.0000 | 0.0000 | 0.0000 | (BEND) |
| D(2) | 0.0000 | 0.0000 | 0.0000 | 45.0000 | 0.0000 | 0.0000 | (BEND) |

TABLE IVa

Aspheric Constants

| ASP | CURV | K | A | B | C | D |
|---|---|---|---|---|---|---|
| A(1) | 0.20029842 | 0.000000 | 2.89248E-02 | -1.78598E-02 | 1.08944E-02 | -4.09113E-03 |
| A(2) | 0.51397620 | 0.000000 | 2.20364E-02 | 1.70886E-02 | -3.21477E-02 | 3.08910E-03 |

TABLE IVb

Decentering Constants

| DEC | X | Y | Z | ALPHA | BETA | GAMMA | |
|---|---|---|---|---|---|---|---|
| D(1) | 0.0000 | 0.0000 | 0.0000 | 45.0000 | 0.0000 | 0.0000 | (BEND) |

TABLE IVc

Infinite Conjugates

| | |
|---|---|
| EFL = -1.2300 | SEMI-FIELD 26.5000 |
| BFL = -5.5006 | ANGLE = |
| FFL = 4.7624 | ENTR PUPIL 0.3876 |
| F/NO = 3.1734 | DIAMETER = |
| IMAGE DIST = -5.5000 | DISTANCE = 4.9374 |
| OAL = -4.3424 | EXIT PUPIL 2.7237 |
| PARAXIAL -0.6133 | DIAMETER = |
| IMAGE HT = | DISTANCE = 3.1429 |

TABLE Va

Aspheric Constants

| ASP | CURV | K | A | B | C | D |
|---|---|---|---|---|---|---|
| A(1) | -0.02702703 | -1.277611 | -9.96549E-07 | 5.01859E-09 | -1.85523E-11 | 3.02871E-14 |
| A(2) | -0.03185700 | -3.997399 | 3.10809E-O5 | 1.35300E-06 | -5.28529E-08 | 6.79266E-10 |
| A(3) | 0.06362020 | -1.567192 | -2.33961E-05 | 7.37018E-06 | -4.75795E-07 | 1.18900E-58 |

TABLE Vb

Decentering Constants

| DEC | X | Y | Z | ALPHA | BETA | GAMMA | |
|---|---|---|---|---|---|---|---|
| D(1) | 0.0000 | -8.5000 | 0.0000 | 0.0000 | 0.0000 | 0.0000 | |
| D(2) | 0.0000 | 0.0000 | 0.0000 | 0.0000 | 0.0000 | 0.0000 | (BEND) |
| D(3) | 0.0000 | 0.0000 | 0.0000 | -45.0000 | 0.0000 | 0.0000 | (BEND) |
| D(4) | 0.0000 | -2.2000 | 0.0000 | 0.0000 | 0.0000 | 0.0000 | |

TABLE Vc

Infinite Conjugates

| | |
|---|---|
| EFL = -21.9752 | SEMI-FIELD 0.0000 |
| BFL = 5.4719 | ANGLE = |
| FFL = -4.8513 | ENTR PUPIL 7.0000 |
| F/NO = -3.1393 | DIAMETER = |
| IMAGE DIST = 5.4798 | DISTANCE = -15.0000 |
| OAL = 13.8774 | EXIT PUPIL 7.7489 |
| PARAXIAL 0.0000 | DIAMETER = |
| IMAGE HT = | DISTANCE = -18.8544 |

What is claimed is:

1. In an aircraft turret including, a rigid disk-shaped floor plate, a rigid generally cylindrical shroud that covers said floor plate and defines an opening for a thin planar FLIR input window mounted normal to said floor plate with a width parallel to said plate at least twice its height, and a FLIR mounted on said floor plate coupled to control panels in said aircraft by means of one or more wire harnesses; wherein said FLIR includes:

a folded optical axis of a length greater than the largest dimension of said turret and composed of separate sets of contiguous optic axis segments, said sets being defined by a number of replaceable kits, including at least an airkit and an afocal kit, each said kit having a series of optical elements the axes of which define said sets;

said airkit set including,
at least a portion of the three final segments of said folded optical axis including all of a middle segment along which are mounted three medium aperture far-infrared refractive lens elements on either side of an intermediate focal plane, a scan folding mirror at one end of said middle segment defining an end portion of a segment in a preceding kit normal to said middle segment, an interlace folding mirror at the opposite end of said middle segment defining a last segment normal to said middle segment coplanar and oppositely directed to said end portion, whereby said end portion, middle segment and output segment lie in a common airkit plane and said scan mirror is the only airkit element on said end portion;

only two far-infrared refractive lens elements mounted along said last segment; and a far-infrared diode detector array behind a flat heat insulated far-infrared window in a cryogenic cooling dewar terminating said last segment.

2. A turret mounted FLIR according to claim 1; wherein said airkit further includes:
a standard temperature sampling means mounted at a sample point along said optical axis between said intermediate focal plane and said interlace mirror to periodically insert a standard light signal at said sample point, while leaving said intermediate focal plane free.

3. A turret mounted FLIR according to claim 2; wherein said airkit further includes:
an optical filter element without refractive power mounted at a filter point along said optical axis between said intermediate focal plane and said scan mirror to reduce the size requirement for said filter.

4. A turret mounted FLIR according to claim 1; wherein said airkit further includes:
an optical filter element without refractive power mounted at a filter point along said optical axis between said intermediate focal plane and said scan mirror to reduce the size requirement for said filter, while leaving said intermediate focal plane free.

5. A turret mounted FLIR according to claim 1 wherein:
said refractive lens elements are formed from GaAs and ZnS, to reduce heating problems; and
one surface of each of said refractive lens elements is aspherically ground to provide minimum spherical aberration.

6. A turret mounted FLIR according to claim 1; wherein;
said turret is the type used by an aircraft pilot for navigation;
said airkit common plane is parallel to said floor plate with said optic elements on said main and last output segments mounted as close to said plate as the dimensions of said optical elements will permit;
said shroud includes a remote controlled head mirror, facing said window, at least twice as wide as its height, attached inside the top of said shroud by means of a motorized horizontal axle parallel to said window and floor plate that rotates said head mirror approximately ±45 degrees from its normal line of sight; and
said afocal kit further includes;
a deflection plane normal to said window and floor plate that includes a FLIR point substantially centered on the left half of said head mirror, as seen looking into said shroud with said floor plate horizontal;
said airkit being positioned so that said deflection plane includes said end portion;
an upward folding mirror centered on the intersection of said common airkit plane and said deflection plane at a deflection point below and slightly behind said head mirror;
whereby said optical axis of said FLIR comprises that of said airkit, an extension segment from said scan mirror to said upward folding mirror; a vertical segment extending from said deflection point to said FLIR point and a FLIR input segment from said FLIR point to said window in said deflection plane that moves with said head mirror;
an auxiliary focal plane normal to said extension segment adjacent said upward folding mirror;
three navigation afocal refracting lenses mounted along said vertical segment to focus an image of a distant object on said auxiliary focal plane; and
two navigation relay refracting lenses mounted along said extension segment to reduce the size of said image to match the input aperture of said airkit.

7. A turret mounted FLIR according to claim 6; further including:
a cylindrical cryogenic cooler coupled to said dewar with an axis of symmetry parallel to said main segment and one end overlapping said dewar;
a general electronics package mounted on said floor plate under said cooler, for powering and/or remotely controlling elements, such as said head mirror, said cooler, other electronic packages, cameras or test equipment within said turret as well as motors that move said turret; and
a computer electronics package mounted on said floor plate between said airkit and said shroud side wall furthest from said dewar, to generate and process electronic image data from said FLIR.

8. A turret mounted FLIR according to claim 7, further including:
a camera using an image intensifier tube for visible, near infrared and ultra-violet frequencies mounted on said floor plate below said head mirror with its optical axis meeting said head mirror at a camera point centered on the right half of said mirror, as seen through said window, thereby defining a turret camera optical axis normal to said window through said camera point;
an electronics package for said camera mounted on said floor plate between said dewar and said shroud side wall nearest said camera, said harnesses interconnecting said FLIR, Camera and all of said electronics packages whereby said camera and said FLIR can share storage, processing and display capabilities.

9. A turret mounted FLIR according to claim 6; wherein:
said two navigation relay refracting lenses are mounted on a motorized slide to remotely adjust the focus at said auxiliary focal plane.

10. A turret mounted FLIR according to claim 6 wherein:
said refractive lens elements are formed from Germanium and ZnS, to reduce chromatic aberration; and
one surface of each of said refractive lens elements is aspherically ground to provide minimum spherical aberration.

11. A turret mounted FLIR according to claim 1; wherein:
said turret is the type used by a gunner for targeting;
said airkit is mounted with said main segment perpendicular to said floor plate and said airkit output segment parallel and as close as possible to said plate, whereby said airkit end portion segment lies in a target plane parallel to said floor plate near the top of said shroud and parallel to a diametrical reference relay line in said target plane through the axis of symmetry of said plate tilted 30 degrees to said window, the right end of said relay line being furthest from said window; and
said kits also include a relay lens kit, which further includes;
a cross segment of said optical axis normally intersected by the right end of said relay line with a first and second relay folding mirrors, mounted at first and second tips of said cross segment, normal to said floor plate and closely adjacent to the right sidewall of said shroud, defining a folded U-shaped section of said optical axis with input and output relay segments parallel to said relay line from first and second tips, respectively, said target plane also partially defining a window segment of said optical axis normal to said relay input segment from said first tip extending through the left side of said window;

said airkit having cylindrical-shaped scan and thermal standard motors with axial lengths about equal to said dewar and being normal to all said airkit axial segments, said airkit end portion being collinear with said relay input segment and said airkit being located as near to the right end of said relay line as the motor dimensions permit;

special folding mirror means mounted beyond the free left tip of said relay input segment to redirect radiation entering along said window segment to said relay input segment;

a relay focal plane between said relay folding mirrors, first and second pairs of targeting refractive relay lens elements mounted, respectively, on said relay input and output segments; said first pair forming a high quality image at said relay focal plane and said second pair forming an image to fit said airkit aperture, thereby providing a medium or other field of view depending on the structure of said special folding mirror means.

12. A turret mounted FLIR according to claim 11; wherein said special folding mirror means includes:

a series of four afocal mirrors, with flat back surfaces adjacent to and facing the top of the sidewall of said shroud;

said back surfaces being normal to said floor plate with each said afocal mirror substantially intersecting a different one of four quadrants of said target plane;

the first, second and fourth of said afocal mirrors having aspherically ground areas on their front surface, the remainder of said front surfaces being flat, whereby said optical axis is folded into first second and third additional reflective segments between said window segment and said relay input segment;

said afocal mirrors forming a mirror focal plane, with a high quality image, between the center of said third segment and said third afocal mirror;

said first afocal mirror having a dimension parallel to the symmetry axis of said floor plate greater than half the same dimension of said shroud and being centered on said window segment;

said fourth afocal mirror having a dimension parallel to the symmetry axis of said floor plate almost twice the same dimension of the largest lens in said relay kit and being coaxial with said relay input segment;

said first, third and fourth reflective segments, respectively, being greater than half the diameter of said floor plate and said fourth segment being collinear with said relay input segment;

said second mirror in said series being arranged to redirect said optical axis over said second reflective segment greater than half the other said reflective segments, thereby providing a very long focal length and a ury narrow field of view FLIR.

13. A turret mounted FLIR according to claim 12; wherein said special folding mirror means further includes:

a switch mirror centered on the intersection of said relay input segment with said window segment;

said switch mirror being mounted on a primary remote controlled motor means for removing said plane folding mirror entirely from the optical path in response to a primary signal, whereby said FLIR optics may provide a remote controlled medium or narrow angle of view.

14. A turret mounted FLIR according to claim 13; wherein:

a first pair of afocal lenses are mounted on said window segment by a secondary remote controlled motor means for removing said first pair from said optical path in response to a secondary signal; and a second pair of afocal lenses are mounted on said relay input segment by a tertiary remote controlled motor means for removing said second pair from said optical axis in response to a tertiary signal; whereby said FLIR optics may provide a remote controlled wide, medium or narrow angle of view.

15. A turret mounted FLIR according to claim 11; wherein said special folding mirror means includes:

a primary plane folding mirror mounted centered on the intersection of said relay input segment with said window segment, thereby providing at least a medium field of view FLIR.

16. A turret mounted FLIR according to claim 11; wherein:

a first pair of refractive afocal lenses are mounted on said window segment by a secondary remote controlled motor means for focusing and removing said first pair from said optical path in response to focusing and removing secondary signals, respectively; and a second pair of refractive afocal lenses are mounted on said relay input segment by a tertiary remote controlled motor means for focusing and removing said second pair from said optical axis in response to a tertiary focusing and signals, respectively; whereby said FLIR optics may provide a remote controlled wide or medium angle of view.

17. A turret mounted FLIR according to claim 16 wherein:

said refractive lens elements are formed from GaAs and ZnS, to reduce heating problems; and one surface of each of said refractive lens elements is aspherically ground to provide minimum spherical aberration.

18. A turret mounted FLIR according to claim 11, wherein:

at least one of said first and second pairs of targeting refractive relay lens elements are mounted on a motorized slide to remotely adjust the focus at said auxiliary focal plane.

19. A turret mounted FLIR according to claim 11 wherein:

said refractive lens elements are formed from GaAs and ZnS, to reduce heating problems; and one surface of each of said refractive lens elements is aspherically ground to provid minimum spherical aberration.

20. A turret mounted FLIR according to claim 1; wherein:

a pair of said three medium aperture lens elements are mounted on a motorized slide to remotely adjust the focus at said intermediate focal plane.

* * * * *